(12) United States Patent
Takefman et al.

(10) Patent No.: US 8,713,379 B2
(45) Date of Patent: Apr. 29, 2014

(54) SYSTEM AND METHOD OF INTERFACING CO-PROCESSORS AND INPUT/OUTPUT DEVICES VIA A MAIN MEMORY SYSTEM

(75) Inventors: Michael L. Takefman, Nepean (CA); Maher Amer, Nepean (CA); Riccardo Badalone, St Lazare (CA)

(73) Assignee: Diablo Technologies Inc., Ottawa (CA)

( * ) Notice: Subject to any disclaimer, the term of this patent is extended or adjusted under 35 U.S.C. 154(b) by 167 days.

(21) Appl. No.: 13/303,048

(22) Filed: Nov. 22, 2011

(65) Prior Publication Data

US 2012/0204079 A1     Aug. 9, 2012

Related U.S. Application Data

(60) Provisional application No. 61/457,233, filed on Feb. 8, 2011.

(51) Int. Cl.
*G06F 11/00* (2006.01)
*H03M 13/00* (2006.01)

(52) U.S. Cl.
USPC .......................................... 714/701; 714/811

(58) Field of Classification Search
USPC ................ 714/701, 755, 763, 746, 799, 811; 711/200; 380/255
See application file for complete search history.

(56) References Cited

U.S. PATENT DOCUMENTS

| | | | |
|---|---|---|---|
| 5,459,742 A * | 10/1995 | Cassidy et al. | 714/769 |
| 6,765,506 B1 * | 7/2004 | Lu | 341/50 |
| 7,032,158 B2 * | 4/2006 | Alvarez et al. | 714/763 |
| 7,328,380 B2 * | 2/2008 | Pomaranski et al. | 714/718 |
| 7,984,232 B2 * | 7/2011 | Kimura | 711/103 |
| 8,001,434 B1 | 8/2011 | Lee et al. | |
| 8,301,833 B1 | 10/2012 | Chen et al. | |
| 8,359,501 B1 | 1/2013 | Lee et al. | |
| 8,516,185 B2 | 8/2013 | Lee et al. | |
| 8,516,187 B2 | 8/2013 | Chen et al. | |

OTHER PUBLICATIONS

Handy, Jim, "Using Flash As Memory: A More Straightforward Way to Boost Performance", Objective Analysis Semiconductor Market Research (Jul. 2013).

* cited by examiner

*Primary Examiner* — Shelly A Chase
(74) *Attorney, Agent, or Firm* — Steptoe & Johnson LLP

(57) ABSTRACT

A system for interfacing with a co-processor or input/output device is disclosed. According to one embodiment, the system includes a computer processing unit, a memory module, a memory bus that connects the computer processing unit and the memory module, and a co-processing unit or input/output device, wherein the memory bus also connects the co-processing unit or input/output device to the computer processing unit.

13 Claims, 16 Drawing Sheets

SYSTEM AND METHOD OF INTERFACING CO-PROCESSORS AND INPUT/OUTPUT DEVICES VIA A MAIN MEMORY SYSTEM

CROSS-REFERENCES

The present application claims the benefit of and priority to U.S. Provisional Patent Application No. 61/457,233 filed on Feb. 8, 2011, entitled "Main Memory Co-processors And Input/Output Devices," which is herein incorporated by reference.

RELATED FIELD

The present disclosure relates in general to the field of computers, and in particular, to the interfacing of co-processors and input/output (I/O) devices via a main memory system.

BACKGROUND

A computer system utilizes multiple buses to connect various components of the computer system. The buses are physical connections that allow the various components to communicate information (e.g.—commands, addresses, and data) throughout the system. Different buses generally support different data bandwidths. For instance, a main memory bus that connects a central processing unit (CPU) to the system memory (e.g.—DRAM) can support a significantly higher data bandwidth than that supported by an I/O bus (e.g.—PCI, PCI-Express, etc.).

Traditionally, co-processors and I/O devices interface to the computer system via the I/O bus. For some I/O or co-processing applications, interfacing to the computer system via the I/O bus provides reasonable performance. However, the lower bandwidths supported by I/O buses often create communications bottlenecks for I/O or co-processing applications that are able to operate at much faster speeds.

Therefore, there exists a need for a system and method for interfacing co-processors or I/O devices in a computer system that provides enhanced I/O capabilities and performance. Particularly, there exists a need for a system and method for interfacing co-processors or I/O devices via the main memory system.

SUMMARY

A system for interfacing with a co-processor or input/output device is disclosed. According to one embodiment, the system includes a computer processing unit, a memory module, a memory bus that connects the computer processing unit and the memory module, and a co-processing unit or input/output device, wherein the memory bus also connects the co-processing unit or input/output device to the computer processing unit.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

Figure 1:
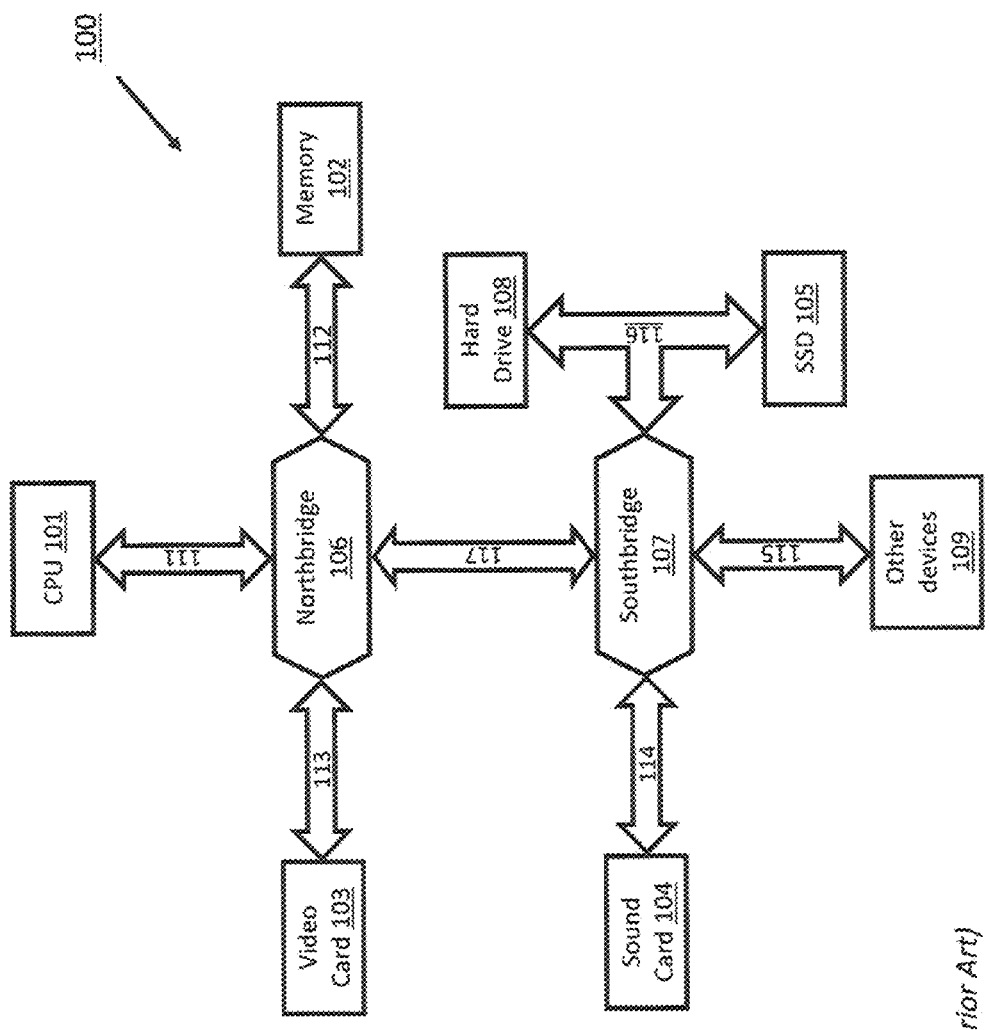
FIG. 1 illustrates a block diagram of a typical prior art computer architecture that connects co-processors or I/O (CPIO) devices via I/O buses.

The figures are not necessarily drawn to, scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAIL DESCRIPTION

Prior Art

FIG. 1 illustrates a block diagram of a typical prior art computer architecture that connects co-processors or I/O (CPIO) devices via I/O buses. A computer system 100 typically includes a CPU (central processing unit) 101, a main memory unit 102 (e.g.—one or more DRAM (dynamic random access memory) modules), and CPIO devices including a video card 103, a sound card 104, a hard drive 108, and an SSD (solid state drive) 105. These components are connected together via buses on a motherboard (not shown). As illustrated, CPU 101, main memory unit 102, and video card 103 are connected via their respective buses, 111, 112 and 113, to a northbridge 106. A northbridge 106 is traditionally a chip in the chipset of the motherboard that connects high speed buses, including the FSB (front-side bus) 111, the main memory bus 112, and the PCI-E (peripheral component interconnect express) bus 113.

Slower buses, including the PCI bus 114, the USB (universal serial bus) 115, and the SATA (serial advanced technology attachment) bus 116 are traditionally connected to a southbridge 107. The southbridge 107 is another chip in the chipset and is connected to the northbridge 106 via a DMI (direct media interface) bus 117. The southbridge 107 manages the information traffic between CPIO devices that are connected via the slower buses. For instance, the sound card 104 typically connects to the system 100 via PCI bus 114. Storage drives, such as hard drive 108 and SSD 116, typically connect via the SATA bus 116. A variety of other devices 109, ranging from keyboards to mp3 music players, may connect to the system 100 via the USB 115.

Both hard drive 108 and SSD 105 are non-volatile data storage units for the computer system 100. However, they operate using different technologies. SSD's generally refer to drives that utilize solid state memory technology that contain no mechanical moving parts, such as flash memory technology. SSD's generally require less power to operate and support faster read speeds compared to hard drives. As non-volatile (e.g.—flash) memory technology continues to evolve and make SSD's more affordable, SSD's are slowly replacing hard drives in many of today's computers.

For certain CPIO devices (e.g.—sound card 104), connecting to the computer system via the slower buses provides sufficient data bandwidth. However, for CPIO devices (e.g.— SSD 105) that are able to operate at higher bandwidths (e.g.— input/output data at speeds faster than that supported by the bus), connecting via the slower buses creates an I/O bottleneck. There exists a need for a system and method of interfacing CPIO devices in a computer system that provides enhanced I/O capabilities and performance. Particularly, there exists a need for a system and method for interfacing CPIO devices via the main memory system.

System Providing Enhanced I/O Capabilities And Performance

Figure 2:
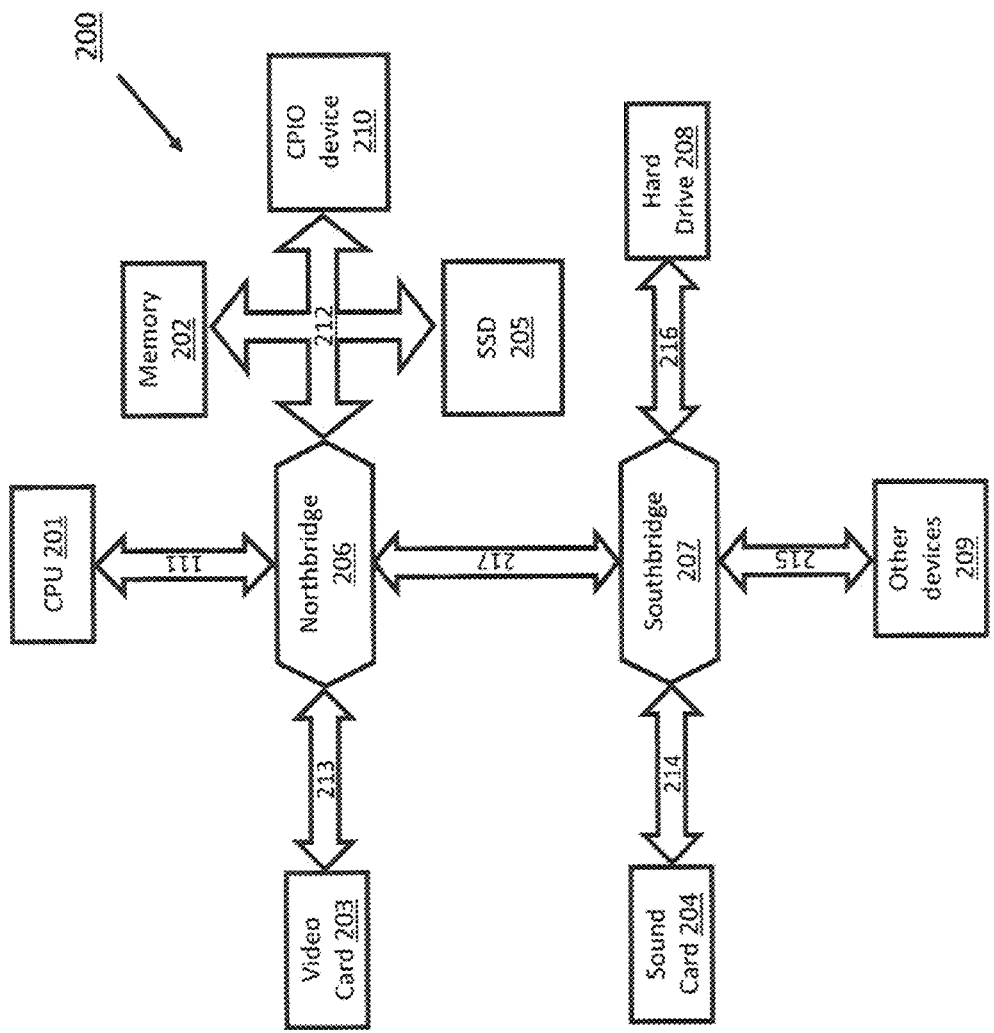
FIG. 2 illustrates a block diagram of a computer architecture for interfacing CPIO devices via the main memory system that provides enhanced I/O capabilities and performance, according to one embodiment.

FIG. 2 illustrates a block diagram of a computer architecture for interfacing CPIO devices via the main memory system that provides enhanced I/O capabilities and performance, according to one embodiment. Computer system 200 includes a CPU (central processing unit) 201, a main memory unit (e.g.—DRAM) 202, and CPIO devices including a video card 203, a sound card 204, a hard drive 208, an SSD 205, and any generic CPIO device 210. These components are connected together via buses on a motherboard (not shown). As illustrated, CPU 201, main memory unit 202, and video card 203 are connected via the FSB 211, the main memory bus 212, and the PCI-E bus 213, respectively, to the northbridge 206. The PCI bus 214, the USB 215, and the SATA bus 216 are connected to the southbridge 207. While FIG. 2 illustrates each of the block components as discrete components, it is contemplated that some of the components may be combined or integrated with one or more other components. For instance, certain CPU's produced by Intel and other vendors include a northbridge as part of the CPU.

In contrast to the prior art architecture illustrated in FIG. 1, the computer architecture of FIG. 2 connects the SSD 205 and any generic CPIO device 210 to the computer system via the main memory bus 212. Similar to the main memory unit 202 (e.g.—DRAM), the SSD 205 and generic CPIO device 210 connect to a memory controller in the northbridge 206 via the main memory bus 212. Because the main memory bus 212 generally supports significantly higher bandwidths (e.g.— compared to the SATA bus 216), this architecture eliminates or significantly alleviates any I/O bottlenecks that would otherwise limit the I/O performance of the SSD 205 or any generic CPIO device 210. Preferably, SSD 205 and any generic CPIO device 210 are designed to be insertable into a DIMM (dual in-line memory module) memory slot.

As FIG. 2 illustrates, this disclosure contemplates that any CPIO device may connect and interface to the computer system via the main memory bus in a manner that will be described below. A CPIO device may include any device that receives data from the host processor, wherein the received data is modified by the CPIO device or is used by the CPIO device to generate new data and the modified or new data is sent back to the host-processor. Examples of co-processors include: encryption, compression, digital signal processing, image processing, pattern matching. Examples of input/output devices include: non-volatile storage, wireless communications, wired communications, RAID control devices.

Although SSD 205 is used to facilitate the description below, the scope of this disclosure is not limited to the application of SSDs or to the application of any particular CPIO device. The methods and systems disclosed herein are applicable for use with any CPIO device. SSD 205 belongs to a new type of CPIO device. To distinguish from prior art memory devices and, to simplify explanation, this new type of CPIO device is subsequently referred to as a "TeraDIMM." Names and labels (e.g.—"TeraDIMM", "Rush", "Bolt", etc.) are used herein only for the purposes of description and should not be interpreted as limiting in anyway.

In the context of a storage. CPIO device, a TeraDIMM is a new class of DIMM memory that enables the creation of physical memory systems that can match the virtual memory capabilities of CPU's by integrating non-volatile memory (e.g.—NAND flash, phase-change, etc.) into, for instance, a DDR-3 or DDR-4 memory channel. TeraDIMMs compatible with future memory technologies (e.g.—DDR-5, etc.) are contemplated and are within the scope and spirit of this disclosure.

A TeraDIMM acts in a manner similar to an SSD, but with the parallelism/bandwidth/scalability advantage that comes from the form factor/location in the main memory system as compared to the limited number of PCI-E devices or disk drives. A TeraDIMM can be used as: a virtual memory swap device, a generalized file system device, a cache layer for remote storage. As far as the system is concerned, when connected to the system, a TeraDIMM appears to be a standard DIMM memory device, such as an RDIMM (registered DIMM). A number of implementations of the TeraDIMM are contemplated. For instance, a TeraDIMM may also appear to the system as a UDIMM (unregistered memory), a LRDIMM (load-reduced DIMM), etc.

A TeraDIMM is distinguishable from a SATADIMM that is produced by Viking Modular Solutions. A SATADIMM resides in the DIMM memory slot of a motherboard to take advantage of spare DIMM memory slots for drawing power. However, I/O operations such as, data transfers to and from a SATADIMM is by way of a SATA cable connected to the SATADIMM. Thus, unlike a TeraDIMM, a SATADIMM does not take advantage of the significantly higher bandwidth of the main memory bus for I/O operations.

TeraDIMM Architecture

A TeraDIMM may be a single-rank DIMM, a dual-rank DIMM, or a quad-rank DIMM. According to one embodiment, a single-rank TeraDIMM includes one rank of non-volatile memory (NVM). According to one embodiment, a dual-rank TeraDIMM includes one rank of NVM and one rank of DRAM. According to one embodiment, a quad-rank TeraDIMM includes two ranks of NVM and two ranks of DRAM. This disclosure is not limited to these embodiments and TeraDIMMs having increasingly more ranks are contemplated (e.g.—6-rank, 8-rank, etc.). A rank of memory generally refers to the set of memory devices on a module that is selected by the same chip select signal. The number of ranks that is accessible on a memory module depends on the memory controller. For instance, a memory controller that provides two chip select signals per memory slot can access up to two ranks on a memory module. A memory controller that provides four chip select signals per memory slot can access up to four ranks on a memory module.

For a single-rank TeraDIMM, BIOS (basic input/output system) changes may be implemented to pass the BIOS's memory test. The BIOS is a set of firmware instructions that is run by a computer system to setup hardware and to boot into an operating system when it is first powered on. One of the first operations performed by the BIOS after power on is to access the memory module's SPD (serial presence detect). Accessing the SPD provides the BIOS with information about the memory module, such as its size (e.g.—number of ranks), data width, manufacturer, speed, and voltage. After determining the memory module's rank, the BIOS typically performs a memory test on each rank in the module. A single-rank TeraDIMM may fail this memory test because it does not have as much physical DRAM-speed memory as was declared in the SPD. Although a single-rank TeraDIMM may respond to all memory addresses at speed, it generally aliases memory words. This aliasing may be detected by a memory test as a bad memory word.

For a dual/quad-rank TeraDIMM, no BIOS changes may be implemented to bypass the BIOS's memory test. When a dual/quad-rank TeraDIMM is first powered on along with the computer system, the TeraDIMM aliases the chip signals that select the NVM ranks to the chip signals that select the DRAM ranks. For instance, for a dual-rank TeraDIMM, chip select signal 1 (CS1) that Selects the NVM rank may be aliased to the CS0 that selects the DRAM rank. This way, when the computer system selects the NVM rank to write and read from, the data is actually written and read from the DRAM rank. Similarly, for a quad-rank TeraDIMM, CS2 and CS3 for selecting the two NVM ranks may be aliased to CS0 and CS1 which are used to select the two DRAM ranks. Finally, a dual-rank TeraDIMM may be advertised as, a single-rank DIMM where by the rank of DRAM is used during the BIOS memory test.

Figure 3:
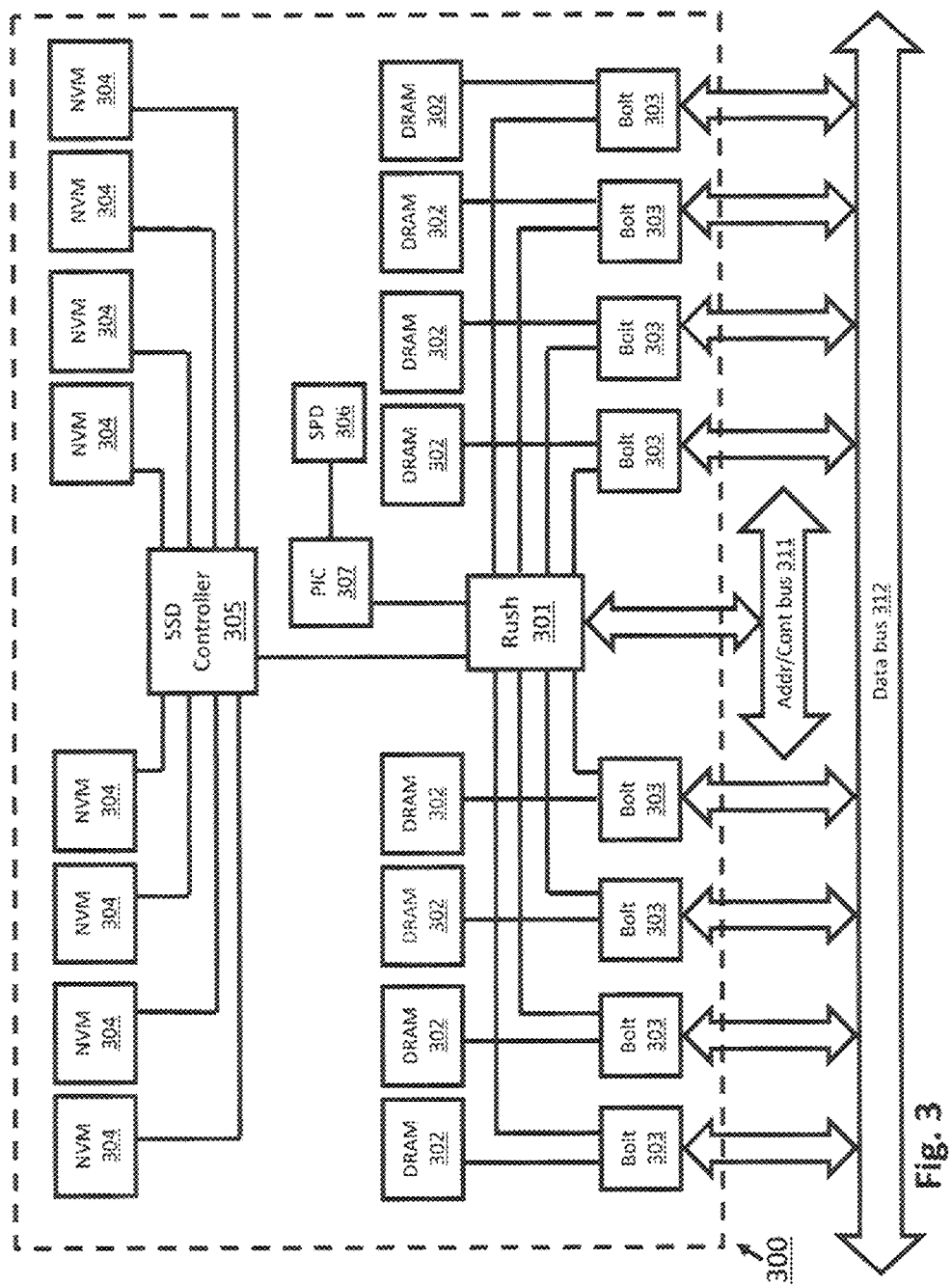
FIG. 3 illustrates a block diagram of a dual-rank TeraDIMM, according to one embodiment.

FIG. 3 illustrates a block diagram of a dual-rank TeraDIMM, according to one embodiment. As shown, the TeraDIMM 300 includes an ASIC 301, herein the "Rush," a rank of DRAM devices 302, a number of data buffer devices 303, herein "Bolt devices," a rank of NVM devices 304, an SSD controller 305, an SPD 306, and a PIC microcontroller 307. Similar to an RDIMM, the Rush 301 provides registers and a phase-locked loop circuit, herein "RPLL circuitry," to reduce the electrical load on the control lines for the memory controller. The Rush 301 also includes control circuitry for the Bolt devices 303 and an interface (e.g.—SATA, PCI-E, etc.) to the SSD controller 305. The SSD controller 305 manages the flow of, data going to and from the NVM devices 304. It is contemplated that the functions of the SSD controller 305 may be integrated into the Rush 301. The address/control bus 311 is connected to the Rush 301 while the main memory bus 312 is separated from the on-DIMM memory bus by the Bolt devices 303.

Each of the Bolt devices include three DDR-3 ports with bi-directional octal flip flops and muxes that allow the host port (connected to the memory bus) to connect to any of the three DDR-3 ports. Furthermore, each port of the DDR-3 ports can be tri-stated and can signal using DDR-3 DQ/DQS signaling. Bolt devices 303 provide retiming of data bursts from the computer system to/from the DRAM devices 302 or Rush 301. Bolt devices 303 also provide a separation that allows on-DIMM DMA (direct memory access) to occur between the DRAM devices 302 and the Rush 301.

One aspect to the Rush 301 data interface is the inclusion of per-lane delay compensation circuits that, for instance, provide programmable launch times and lane de-skew on receive. Because of the difference in the distances between the Bolt devices 303 and the Rush 301 and the Bolt devices 303 and the DRAM devices 302, the TeraDIMM may arrange its launch time such that its data arrives at an appropriate time. It is contemplated that these values may be calibrated during manufacturing and stored in onboard memory, such as NVRAM (non-volatile RAM). It is also contemplated that with appropriate changes to the BIOS firmware, these calibrations may be performed in-system as part of other BIOS calibrations.

Figure 4:
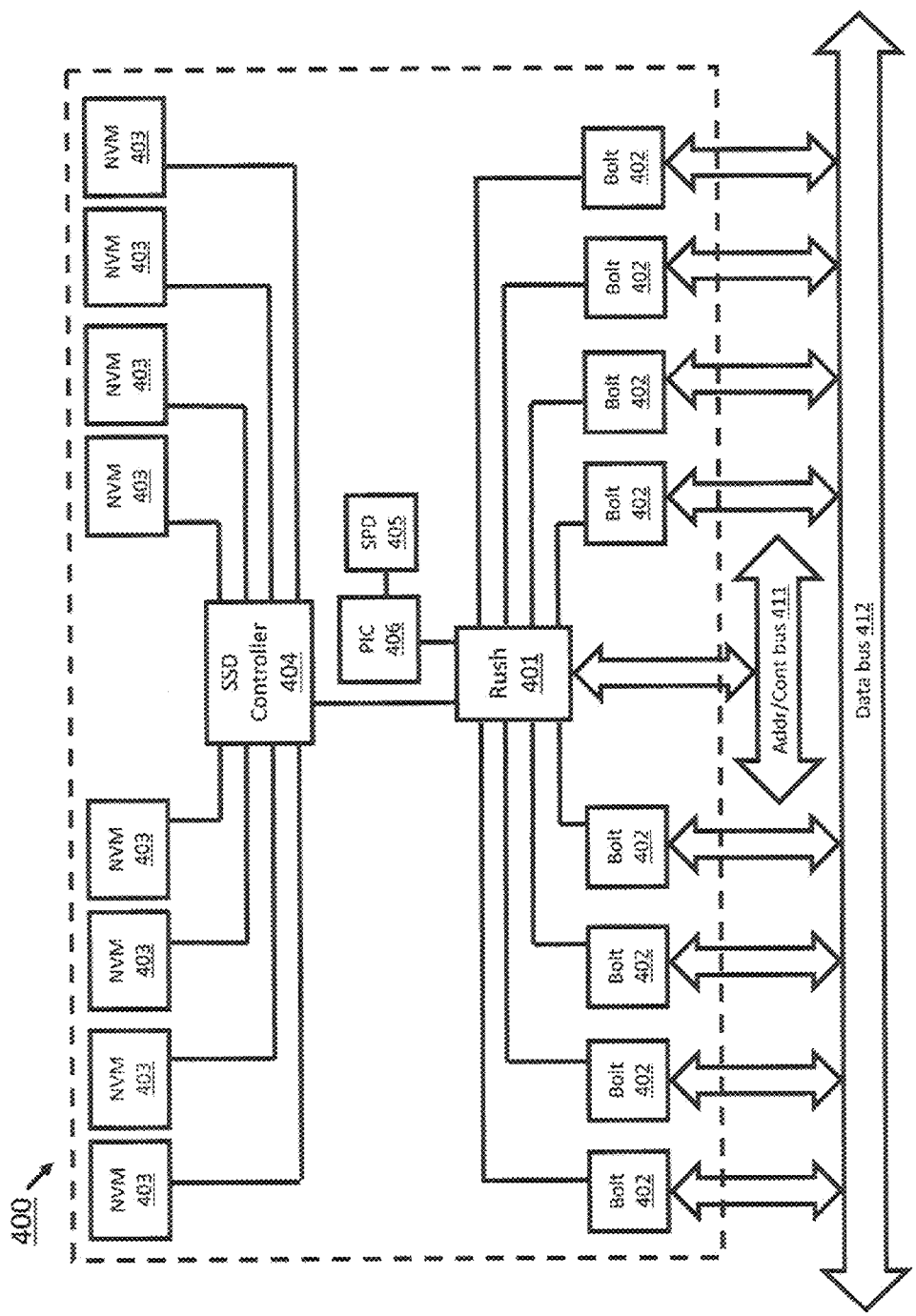
FIG. 4 illustrates a block diagram of an exemplary single-rank TeraDIMM, according to one embodiment.
Figure 5:
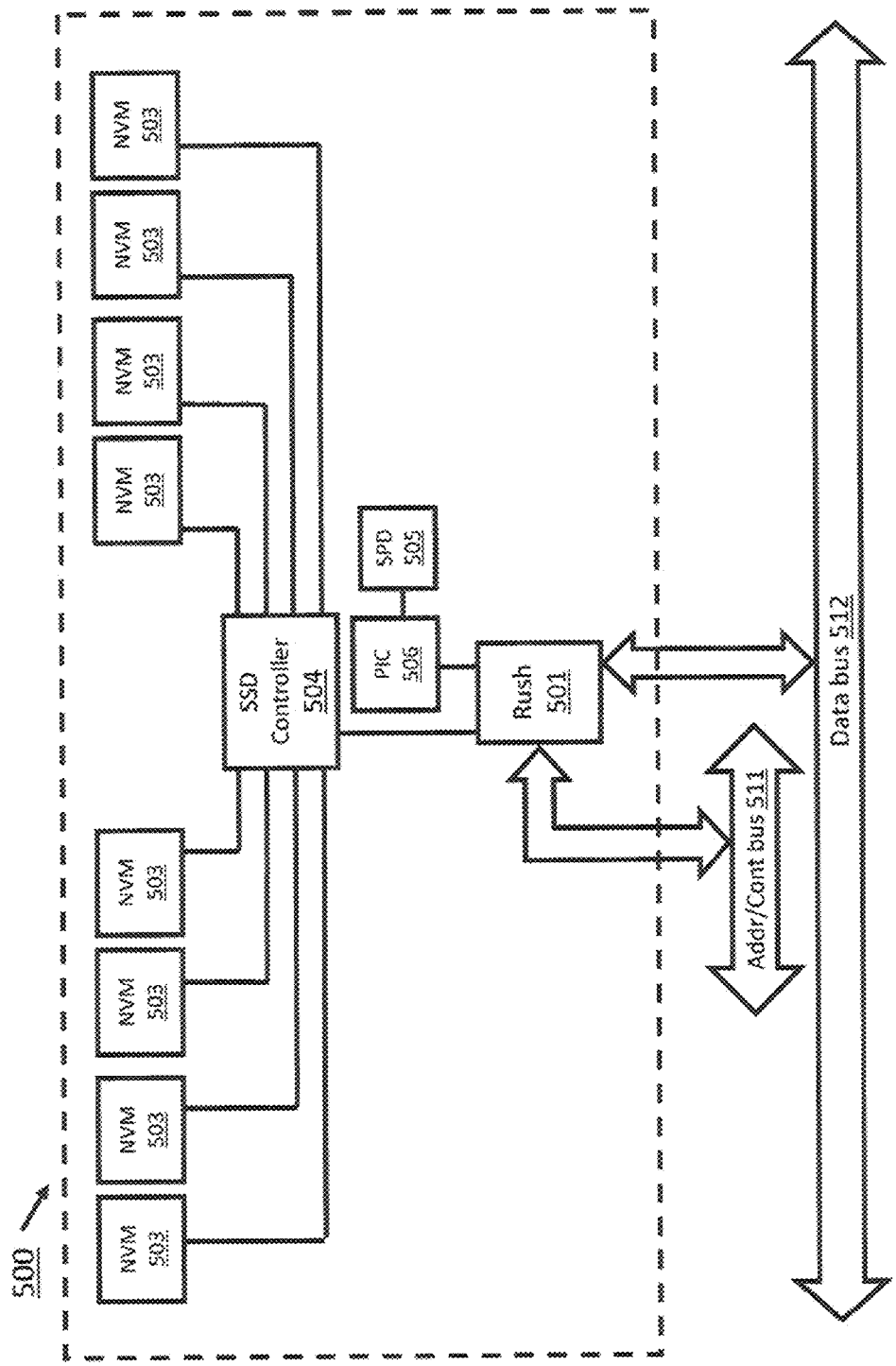
FIG. 5 illustrates a block diagram of an exemplary single-rank TeraDIMM in which the memory bus is connected directly to the Rush, according to one embodiment.

FIG. 4 illustrates a block diagram of an exemplary single-rank TeraDIMM, according to one embodiment. Because this embodiment does not include any DRAM devices, it provides for significantly more room for NVM devices. As discussed above, BIOS changes may be implemented to pass the memory test at BIOS boot (e.g.—disable the memory test). According to one embodiment illustrated in FIG. 5, the memory bus 512 may be connected directly to the Rush 501. This embodiment does not include any DRAM or Bolt devices.

TeraDIMM Installation

In addition to performing a memory test, the BIOS generally controls the programming of the CPU memory controller and creates a mapping used by the operating system (OS) to understand what memory addresses are valid. The mapping of host logical addresses to DIMM physical addresses depends on the design of the CPU and the BIOS programming. A number of features that will be discussed later are designed to avoid, having to make changes to the BIOS (as discussed earlier, a single-rank TeraDIMM may implement BIOS changes to disable the memory test). Thus, a TeraDIMM may be installed on a computer system with or without BIOS changes.

Figures 6, 7:
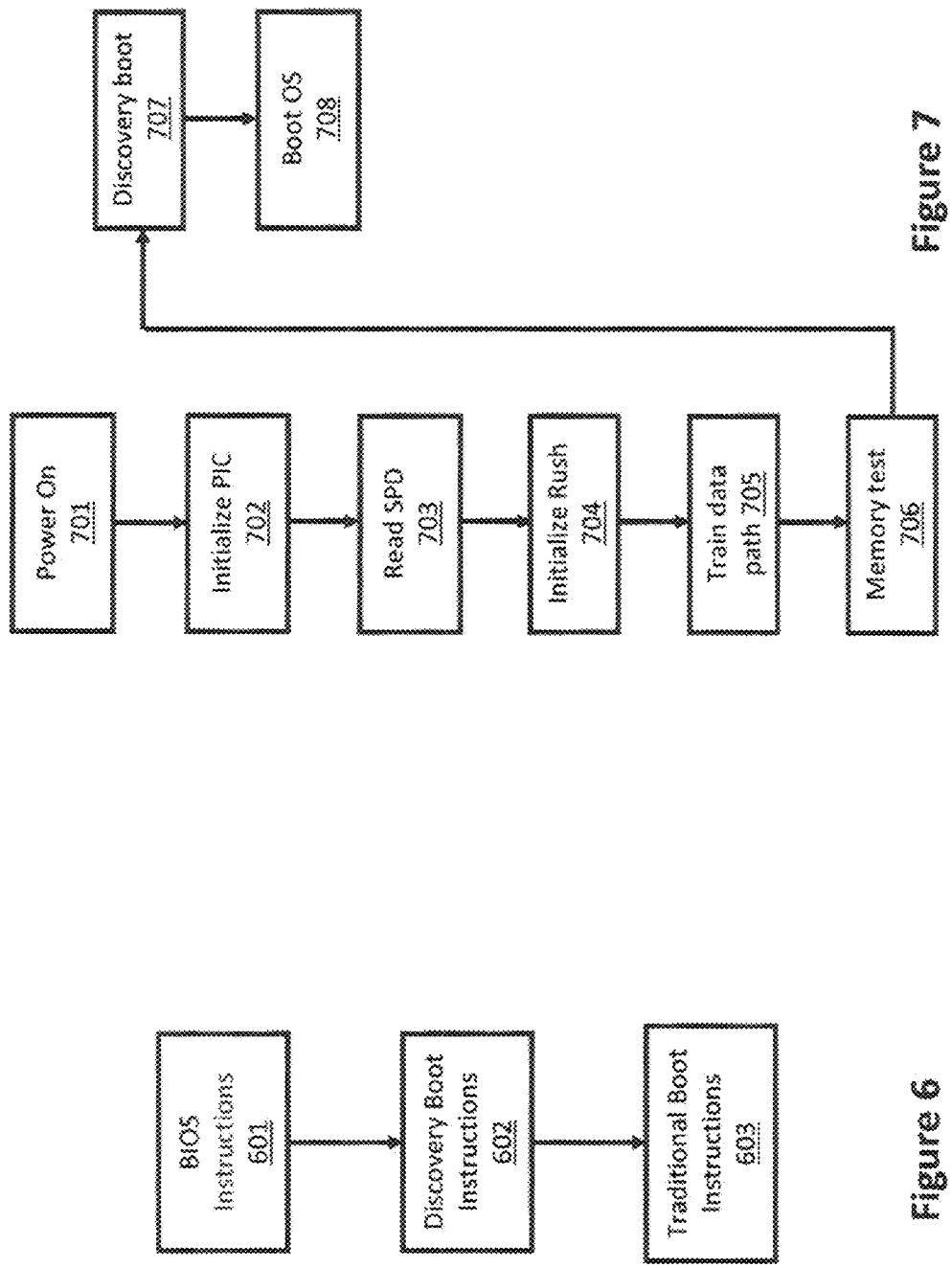
FIG. 6 illustrates an exemplary boot sequence incorporating a discovery boot loader, according to one embodiment.
FIG. 7 illustrates an exemplary flowchart of the TeraDIMM initialization process, according to one embodiment.

For systems in which BIOS changes to accommodate a TeraDIMM are'not desired or not possible, a discovery boot loader may be installed to properly configure the operating system/driver for operation with a TeraDIMM. As illustrated in FIG. 6, the discovery boot loader instructions 602 are performed after the BIOS instructions 601 and prior to the traditional boot loader instructions 603. From a DIMM operational perspective, there is no difference whether a TeraDIMM was initialized using a discovery boot loader. In general, a TeraDIMM driver may also be installed to communicate with the Rush ASIC.

The discovery boot loader includes instructions for system discovery. System discovery is a subsection of the TeraDIMM initialization process and may be necessary when BIOS changes are not made to properly recognize a TeraDIMM. The role of discovery is to determine where a TeraDIMM fits into the memory map, and determine if that mapping can be used by the TeraDIMM driver to operate the TeraDIMM. If the memory map is conducive to TeraDIMM operation, then the discovery process may proceed to learn about any data scrambling, address mapping, ECC generation, data interleave/de-interleaving, and bit swizzling for the computer system. Finally, the boot loader modifies the memory map tables (used by the OS for understanding the memory map) to instruct the OS that the TeraDIMM memory space is reserved. Once the discovery boot loader completes its operations and has made proper modifications to the BIOS memory map tables, the traditional boot loader is launched.

TeraDIMM Initialization without BIOS Changes

FIG. 7 illustrates an exemplary flowchart of the TeraDIMM initialization process, according to one embodiment. The TeraDIMM initialization process covers the period from the press of the power-on button to the OS having initialized the TeraDIMM driver. In this embodiment, the TeraDIMM is advertised as an RDIMM by the SPD and the initialization, sequence for RDIMMs (RPLL sequencing) is followed.

The TeraDIMM is powered on at step 701. After powering on, the PIC in the TeraDIMM is initialized at step 702. The PIC is connected to a power rail that also powers the SPD. The PIC should boot and be ready to receive $I^2C$ operations from the host computer system (herein "host") before the host attempts to read the SPD. Alternatively, the PIC may provide SPD data to the host instead of the host reading the SPD directly. Once power to the DIMM is available, the Rush can read configuration/calibration information out of a non-volatile memory or the PIC can program the Rush registers. Information that is programmed into the Rush ASIC may include:
  Manufacturing calibration data to enable Rush and Bolt operation on a per voltage and operating speed basis;
  RPLL/DRAM/Bolt configuration override data on a per voltage and operating speed basis; and
  DIMM configuration data including the number of ranks of DRAM present and the organization of the DRAM (×4/×8)

The host then reads the SPD at step 703. Generally, the BIOS reads the SPD values from all of the DIMMs to determine the intersection of operational parameters. Depending on the SPD values read, the BIOS determines the voltages to apply to the DIMMs. An SPD, typically, includes non-volatile memory (e.g.—EEPROM) for storing memory module information and a thermal sensor: According to one embodiment, the PIC may instead store the memory module information (herein "SPD load") in its internal NVM and use the SPD only as a thermal sensor. This allows multiple SPDs to be stored in the PIC NVM. Storing multiple SPD loads allows the TeraDIMM to appear as a single-rank (safe mode) or dual-rank (normal mode) TeraDIMM. A safe mode may exist to provide a method by which the DIMM can boot in a system in most cases.

Next, the RPLL circuitry in the Rush ASIC and the DRAM memory is initialized at step 704. During RPLL initialization, a number of RPLL RC registers and DRAM MRS registers are written to by the BIOS to control the TeraDIMM. Some of these values need to be "massaged" by the Rush before they're written because the values provided by the host may not be compatible with the TeraDIMM design (especially in a no-BIOS change scenario).

Next, the BIOS performs, training and calibration of the DDR data-path between the host and TeraDIMM at step 705. During this step, the Rush's behavior largely depends on the type of TeraDIMM (e.g.—single/dual/quad-rank). For a TeraDIMM that includes one or more DRAM ranks, the Rush aliases the DRAM ranks so that they are accessed even when the host tries to access NVM ranks. For a TeraDIMM with no DRAM ranks, the Rush aliases its internal buffer to respond to memory accesses. As long as the BIOS does not activate and write more than the number of (e.g.—two) distinct RAS addresses before doing read-backs, there should be no issues. The number of distinct RAS addresses supported is an implementation detail and may grow or shrink as required.

Next, the BIOS performs a memory test and memory initialization at step 706. Generally, during a memory test, the BIOS verifies that all DRAM ranks are fully functional. A single-rank TeraDIMM (e.g.—without DRAM) will fail this test. Thus, this memory test should be disabled for a single-rank TeraDIMM. For dual-rank TeraDIMMs, the Rush aliases the DRAM rank for access to either rank. A dual-rank TeraDIMM may be advertised as a single rank DIMM allowing the Rush to alias the DRAM for the NVM rank. This allows write and read accesses to an NVM rank to be directed to a DRAM rank. As long as the memory test verifies a single rank at a time, there should be no issues. After the memory test, the memory is initialized so that all locations have valid ECC (error-code correction).

Next, having finished with the BIOS instructions, further initialization is handed over to the discovery boot loader at step 707. Generally, the discovery boot loader is responsible for determining the number of TeraDIMMs connected to the system and their memory sizes and identifying the address map of the Rush ASIC. It is also responsible for configuring the Rush ASIC to support data scrambling, ECC generation, data interleaving/de-interleaving, bit swizzling and address linearization. It should be appreciated that the hardware for supporting data scrambling, ECC generation, data interleaving/de-interleaving, bit swizzling and address linearization is flexible and programmable. The ability to program these functions, for instance, allows a single TeraDIMM design to work in a variety of different CPU systems/configurations. Methods for adapting to different configurations include but are not limited to:
  Non volatile storage of necessary parameters on-DIMM;
  BIOS, boot loader or device driver initialization using a side-band communications method (e.g.—host to DIMM SMBUS); and
  Learning method where by the BIOS, boot loader or device driver sends a sequence of memory operations to train the logic and configure the programmable logic.

After all the configuring is done, the discovery boot loader updates the BIOS memory map tables. The ability to learn or program these operational modes allows a given TeraDIMM to be redeployed from one system to another and avoids building TeraDIMM's specific to a given server design.

Finally, after the discovery step, the OS is booted by the traditional boot loader at step 708. As the OS is booting up, the TeraDIMM driver is also initialized. At this stage, the TeraDIMMs connected to the system are in a normal memory, operation mode and are ready to be accessed by the TeraDIMM driver.

TeraDIMM Discovery

As mentioned earlier, the discovery boot loader is responsible for determining the number of TeraDIMMs connected to the system and their memory sizes and identifying the address map of the Rush ASIC. It is also responsible for address learning and ECC and data interleave/swizzle learning. To perform these functions, the Rush operates in a number of special modes. These special modes may be selected via maze unlock sequences.

Maze unlock sequences allow the operating mode of the Rush to be changed without having knowledge of the address map or the ECC or data map. These sequences are identified by comparing bursts of data writes to the same address. Particularly, a comparison is made between the number of data bits that change from one write burst to the next write burst. Basically, the hardware XORs the data bits from successive writes and counts the number of "1"s in the resulting value. The following illustrates how the change in the number of bits between successive writes is not affected by scrambling.

$H(i)!=H(i+1)$; but are both written to the same address
$D(i)=H(i)\hat{}Scrambler$
$D(i+1)=H(i+1)\hat{}Scrambler$
$DV(i)=CountOf1s(D(i)\hat{}D(i+1))$
$DV(i)=CountOf1s(D(i)\hat{}Scrambler\hat{}H(i+1)\hat{}Scrambler)$
$DV(i)=CountOf1s(H(i)\hat{}H(i+1))$ because the two scrambler values are the same.

$H(i)$ represents the data written at sequence position i. $D(i)$ represents the scrambled value of $H(i)$. $DV(i)$ represents number of bits that have changed between the write at i+1 and the write at i by XOR'ing $D(i)$ and $D(i+1)$. As an example, a maze unlock sequence may be $DV(0) \ldots DV(6)=\{64,8,32,4,16,2,8\}$ and $DV(7)$ then indicates which maze is being unlocked.

Once a maze is unlocked, the Rush operates in a mode associated with the entered unlock sequence. Various mazes according to one embodiment are described in the following Table 1.

The memory module exhibits aliasing behavior and is a TeraDIMM if the data read back from rank 0 corresponds to data that was written to rank 1.

At step 802, the DBL determines which of the ranks in the TeraDIMM it: an NVM rank. For a dual-rank TeraDIMM, even though a dual-rank TeraDIMM is detected at step 801, it is still unknown as to which rank is the NVM rank. To make this determination, the DBL first places the TeraDIMM into the "single rank alias for discovery" (herein "SAD") mode (see Table 1). Operating in the SAD mode, the TeraDIMM inverts the data pattern when writing to the NVM rank. Thus, the DBL can find the NVM rank by writing a pattern to each rank and then reading the data back to see which set of data is inverted. The set of data that is inverted corresponds to the NVM rank. Also, operating in the SAD mode, the DBL may detect a single-rank TeraDIMM.

Before the SAD mode can function properly, however, the Rush may need to learn the ECC inversion rules of the host system. This is because, generally, when the host system writes data to a memory module, it also writes a set of ECC bits. Each bit in the ECC is an XOR of a subset of bits from the data. At this point, the ECC rules for generating these bits are unknown to the Rush. If the Rush returns an inverted data pattern without a correct set of ECC bits when read by the host, a read error may occur.

As mentioned earlier, each bit in the ECC is an XOR of a subset of bits from the data. The number of members in the subset is either even or odd. If it is even, then the ECC bit doesn't change if all the data bits are inverted. If the number is odd, then the ECC bit is inverted. Thus, a method by which

TABLE 1

| Maze Name | Sequence | Actions |
| --- | --- | --- |
| Single Rank Alias for Discovery | 64, 8, 32, 4, 16, 2, 8, 1 OR 128 Writes to the same location | In this mode the flash rank inverts the data read from its buffer. Prior to performing a read, the host should send a series of alternating data patterns (bit inverses) so that the ECC inversion behaviour can be learned. The host can find the rank based on writing a pattern to one location and then reading back the inverse pattern when the same location is read. |
| Single Rank Alias for BIOS | 64, 8, 32, 4, 16, 2, 8, 2 | On a single rank DIMM this allows the TeraDIMM to pass BIOS/MRC training by writing to the write entry points (new Activate commands switch buffers and cache the BA/RAS address) and reading back from either the buffer that has a cache hit or any buffer in the case of a cache miss. |
| Base Hunt | 64, 8, 32, 4, 16, 2, 8, 3 | Hunting for Address 0/0/0 mode is enabled. |
| Address Hunt | 64, 8, 32, 4, 16, 2, 8, 4 | Hunting for next address mode is enabled. |
| Address Learning | 64, 8, 32, 4, 16, 2, 8, 5 | Address Learning Mode is enabled. |
| ECC/Interleave/Swizzle Learning | 64, 8, 32, 4, 16, 2, 8, 6 | ECC/Interleave/Swizzle Learning Mode is enabled. |
| Full Unlock | 64, 8, 32, 4, 16, 2, 8, 7 | Rush is fully unlocked, all access types are allowed and the maze is disabled. |

In certain circumstances, there may be a design restriction that prevents the use of maze sequence unlocks. To overcome these restrictions, it is contemplated that various modes of operation on the Rush may also be unlocked by observing N (e.g.—configurable by register) write accesses to the same location without a read or write to another location (a read to the same location may be allowed and would not reset count).

Figure 8:
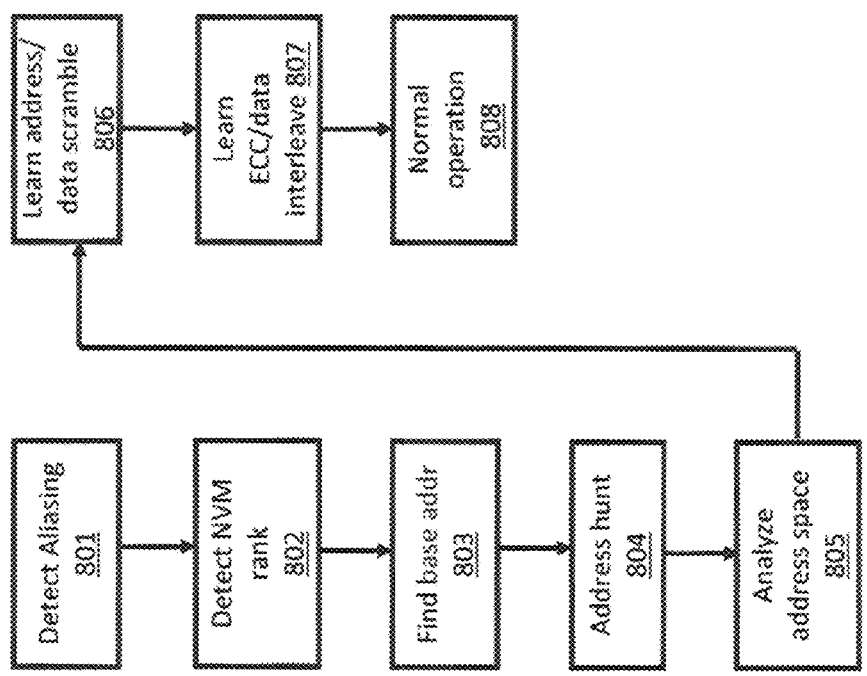
FIG. 8 illustrates an exemplary flow chart of the discovery boot process, according to one embodiment.

FIG. 8 illustrates an exemplary flow chart of the discovery boot process, according to one embodiment. At step 801, the discovery boot loader (herein "DBL") determines whether a memory module is a standard DRAM module or a TeraDIMM module by looking for aliasing behavior. For instance, a dual-rank TeraDIMM may be detected by writing one set of data to rank 0 and then another set of data to the same offset in rank 1 (possibly multiple times for each rank).

the Rush can modify the data and generate correct ECC bits is to have the DBL send a data pattern X and its inverse ~X to the same address. This should be repeated several times (e.g.—four times). The Rush monitors the last two values written to its memory and if the values are bitwise inverses, the Rush determines which ECC bits are inverted. Once the Rush has identified these occurrences several times (e.g.—four times), the Rush will have learned the ECC inversion rules and is ready to start operating in the SAD mode described above. For instance, when the host writes data pattern X, the Rush actually writes the inverse pattern ~X to its memory and inverts the appropriate bits in the ECC byte lane.

After the DBL has identified the NVM rank, the DBL proceeds to step 803 to find the TeraDIMM's base address. The DBL places the TeraDIMM in the "base hunt" (herein "BH") mode (see Table 1). The BH mode operates to help the DBL find the TeraDIMM's base address (e.g.—BA/RAS/CAS=0/0/0). In the BH mode, the discovery aliasing behavior for the NVM rank is such that inverted data is written if the write address BA/RAS/CAS matches 0/0/0. Otherwise, the data is not inverted. This allows the DBL to scan through the entire address space that is mapped to a TeraDIMM and find the host address that generates the base address of the TeraDIMM.

After identifying the TeraDIMM's base address, the DBL proceeds to step 804 to find the address space of the TeraDIMM. The DBL places the TeraDIMM in the "address hunt" (herein "AK") mode (see. Table 1). The AH mode operates as an extension of the BH mode to help the DBL find the address space of the TeraDIMM and behaves in a manner similar to base address learning. For instance, after the DBL has found the host address that corresponds to the TeraDIMM's base address (e.g.—BA/RAS/CAS=0/0/0), the Rush writes inverted data if the TeraDIMM's address does not match 0/0/0x8. Otherwise, the data is not inverted. If the AH mode is entered again (e.g.—retriggering the maze unlock sequence for the AH mode), the Rush will hunt for TeraDIMM address 0/0/0x10. Each retriggering of the AH mode shifts the address up linearly (e.g.—0/0/0x100, 0/0/0x200, and so on) through the CAS (column address strobe), the RAS (row address strobe), and then the BA (bank address).

Next, the DBL proceeds to step 805 to analyze and determine if the DBL is able to operate with the address space of the TeraDIMM. For instance, the DBL should determine whether there is address interleaving and whether there are holes in the address space. According to one embodiment, even if address interleaving is detected, interleaving less than a cache line boundary may be made to work at lower performance. If there are holes, the DBL should determine whether the holes are reasonable. According to one embodiment, whether the holes are reasonable depends on the total number of holes and not the size of any given hole. Reasonableness may be more about the maximum size of the BIOS to OS memory map table.

Next, the DBL proceeds to step 8Q6 for address and data scramble learning and places the TeraDIMM into the "address learning" (herein "AL") mode (see Table 1). It should be appreciated that if address and data scrambling information are known, learning may not be needed (e.g.—bypassing step 806) and such information may be programmed directly into the Rush ASIC configuration registers. For instance, such information may be read from a non-volatile storage unit (e.g.—on-DIMM serial ROM) or loaded into programmable registers by the BIOS, DBL, or device driver via side-band communications methods (e.g.—host to DIMM SMBus).

Operating in the AL mode, the Rush hardware determines information it needs to know in order to:

Scramble/descramble data to/from the host;
Determine the host physical to DIMM physical address mapping and set up the optimal internal mapping; and
Provide the host with a mechanism to learn the mapping Data scrambling/descrambling may be necessary because certain CPU manufacturers (e.g.—Intel) scramble the data that is written to a DRAM based on the address for writing the data. Scrambling data does not present a problem to traditional DRAMs that do not need to understand the data that is being written for storage. A TeraDIMM, on the other hand, may need to understand the commands that are being sent by the TeraDIMM driver running on the host. Thus, data that is written to a TeraDIMM should to be descrambled and data that is sent back to the host should be scrambled (host expects scrambled data back).

To determine the host physical to DIMM physical address mapping and to set up the optimal internal mapping, the Rush includes address mapping hardware. Obtaining the proper mapping allows the TeraDIMM driver to address the set of buffers that are implemented in the Rush. Optimizing the mapping provides for efficient operations. A mapping is considered to be optimized if the data buffers are mapped as contiguous 4 KB chunks and if certain buffers appear in the address map multiple times. Having certain buffers appear multiple times helps to reduce or avoid cache hits (or using cache invalidate instructions) when reading the content of a buffer that is being re-used for a new command. The address learning algorithm and address mapping hardware disclosed herein provides an optimal-mapping solution.

After completing-address and scramble learning, the DBL proceeds to step 807 for ECC and data interleave/swizzle learning. It should be appreciated that if ECC and data interleave/swizzle information are known, learning may not be needed (e.g.—bypassing step 807) and such information may be programmed directly into the Rush ASIC configuration registers. For instance, such information may be read from a non-volatile storage unit (e.g.—on-DIMM serial ROM) or loaded into programmable registers by the BIOS, DBL, or device driver via side-band communications methods (e.g.—host to DIMM SMBus).

ECC and data interleave/swizzle learning may be necessary because a TeraDIMM receives from the host semantic information, such as commands, that is expected in particular byte/bit fields. In contrast, a traditional DIMM generally does hot require any knowledge of the data swizzle mechanism because both the data and ECC bits are stored into the memory together and are written and read in the same order.

ECC algorithms/codes that are used by the host may include 64/72 SEC/DED codes, 128/144 SSC/DSD codes, 256/288 SSC/DSD codes or 256+Addr/288 SSC/DSD codes. Because the flash devices in a TeraDIMM typically use BCH codes rather than SEC/DED or SSC/DSD ECC codes, the Rush should be able to generate and check ECC bits for data sent to and received from the host. According to one embodiment, the ECC bits are generated and checked in the Rush core rather than at the interface to the host. According to one embodiment, a Rush may support a TeraDIMM that does not implement ECC. In this embodiment, the input pins to the check byte lane may be grounded and the drivers may be turned off. Additionally, the ECC bits may not be checked when data is transferred to the Rush.

To facilitate ECC and data interleave/swizzle learning, the DBL places the TeraDIMM into the "ECC/Interleave/Swizzle Learning" (herein)"EIS" mode (see Table 1). Operating in the EIS mode, the DBL initializes and trains the ECC generation circuitry and the de-interleave/de-swizzle circuitry using a learning pattern. After ECC and data interleave/swizzle learning is complete, the TeraDIMM is ready for access by the host for normal operation at step 808. At this point, the discovery boot process finishes and the traditional boot loader takes control for booting the OS on the host.

Data Scrambling

As mentioned earlier regarding Step 806 of FIG. 8, data scrambling/descrambling may be necessary because certain CPU manufacturers (e.g.—Intel) scramble the data that is written to a DRAM based on the address for writing the data. Intel systems, for instance, scramble their data by XOR'ing the data with a scrambler sequence. The scrambler sequence is based on a linear superposition (e.g.—bitwise XOR) of a set of independent vectors where each address bit corresponds to a vector. Some of the vectors are significant (non-zero) and some are not. Using 4-bit data values and 2-bit address values, the example expressions below illustrate how Intel scrambles the binary data value 1100b when writing to address 10b, wherein the "^" operator represents a bitwise XOR operation and $v_0$ and $v_1$ are 4-bit vectors that correspond to address bits 0 and 1, respectively. If the value of address bit i is zero, the vector $v_i$ is a zero vector. Otherwise, vector $v_i$ is non-zero. Vector $v_c$ is a constant vector that may be zero or non-zero.

$$\text{scrambled\_sequence} = (v_c {}^\wedge v_0 {}^\wedge v_1)$$

$$\text{scrambled\_value} = 1100b {}^\wedge (v_c {}^\wedge v_0 {}^\wedge v_1)$$

Because the value of address bit 0 for address 10*b* is zero, $v_0$ is a zero vector and the expression reduces to $$\text{scrambled\_value} = 1100b {}^\wedge (v_1 {}^\wedge v_c)$$

Thus, to descramble the "scrambled_value," the values of vectors $v_1$ and $v_c$ must be known. In the interest of brevity, these vectors $v_i$ that are used in the scrambling sequence are referred to as "generator Vectors."

Figure 9:
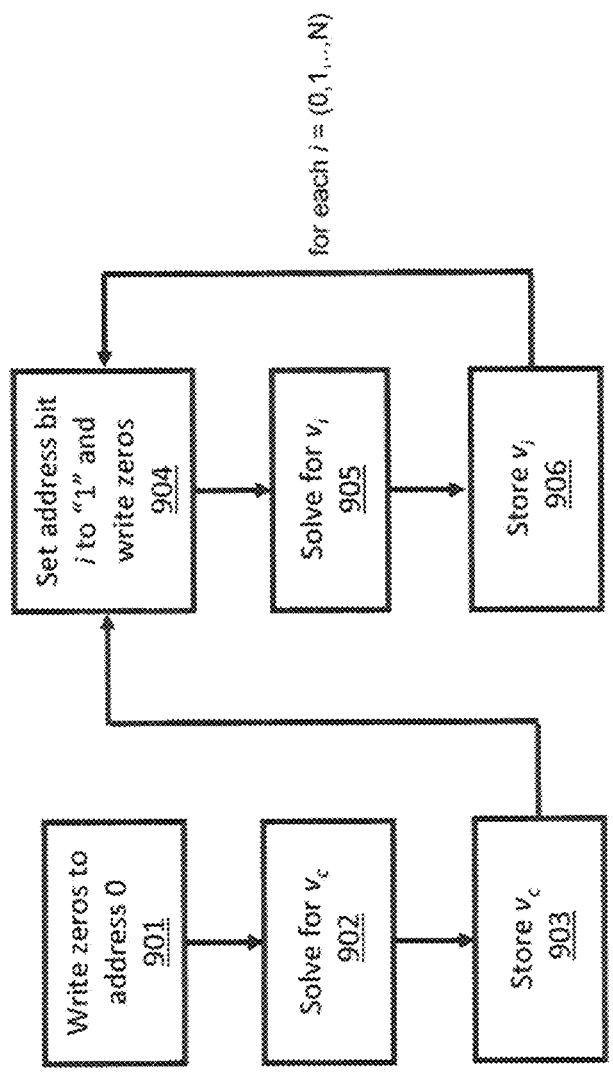
FIG. 9 illustrates an example flowchart of a method for solving for each of the generator vectors, according to one embodiment.

FIG. 9 illustrates an example flowchart of a method for solving for each of the generator vectors, according to one embodiment. First, the host writes a zero data pattern to the address 0b at step 901. This allows the Rush to determine the generator value $v_c$ at step 902. To illustrate, recall from above that the scrambled value that is seen by the Rush when the host writes a data value D is:

$$\text{scrambled\_value} = D {}^\wedge \text{scramble\_sequence where}$$

$$\text{scramble\_sequence} = (v_c {}^\wedge v_0 {}^\wedge v_1 {}^\wedge \ldots v_n), \text{ and } n = \text{number of address bits.}$$

Thus, when the host writes D=0 to address 0b, the scrambled value reduces to:

$$\text{scrambled\_value} = 0b {}^\wedge (0 {}^\wedge 0 {}^\wedge 6 {}^\wedge \ldots {}^\wedge v_c)$$

$$\text{scrambled\_value} = v_c$$

The Rush stores $v_c$ in a vector register at step 903.

To help the Rush solve for the remaining generator vectors (e.g.—$v_0, v_1, \ldots, v_N$, where N corresponds to the address bit position), the host sets one address bit to "1" while all the other address bits are set to "0" and writes a zero data pattern to that address. For instance, to solve for generator $v_i$, the host sets only the address bit at position i to "1" and writes to that address at step 904. The Rush solves for the $v_i$ at step 905 as follows. The scrambled value seen by the Rush is:

$$\text{scrambled\_value} = 0b {}^\wedge (0 {}^\wedge v_i {}^\wedge 0 {}^\wedge \ldots {}^\wedge v_c)$$

$$\text{scrambled\_value} = v_i {}^\wedge v_c$$

Using the stored $v_c$ value found at 901, $v_i$ can be solved for by XOR'ing the scrambled value with $v_c$:

$$\text{scrambled\_value} = 0b {}^\wedge (0 {}^\wedge v_i {}^\wedge 0 {}^\wedge \ldots {}^\wedge v_c)$$

$$\text{scrambled\_value} {}^\wedge v_c = v_i$$

The Rush stores $v_i$ in a corresponding vector register at step 906. Steps 904 through 906 are repeated in that order until all the generator vectors values have been solved for. Having solved for all the generator vector values, the Rush can descramble data received from or scramble data sent to the host.

Figure 10:
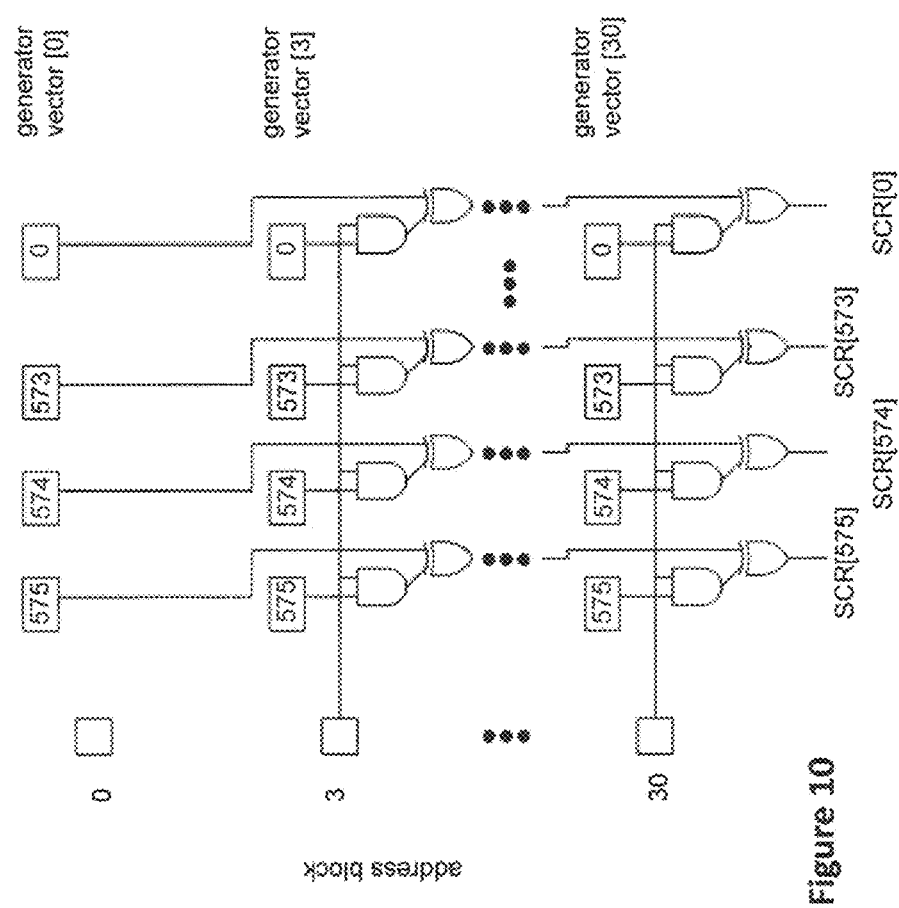
FIG. 10 illustrates a logical implementation of circuitry for generating a scrambler sequence for scrambling data sent to or descrambling data received from the host, according to one embodiment.

FIG. 10 illustrates a logical implementation of circuitry for generating a scrambler sequence for scrambling sent to or descrambling data received from the host, according to one embodiment. As shown, each of the generator vectors are characterized by 576 bits (72-bit wide×8 beat bursts long). Generally, the scramble vectors used by the host are 16-bits wide. For instance, some Intel CPUs use the same 16-bit scramble vector for each of the 16-bit lanes (e.g.—4.5×16-bit lanes for a 72-bit data bus), while other CPUs use a 32-bit-scramble vector. The use of smaller vectors is possible, but s it may limit the applicability of the circuit to certain CPUs. The ECC lanes uses the lower eight bits (e.g.—0.5× of a 16-bit lane). Given the ability of the motherboard to be swizzled, it may be preferable to use a bit width of 72-bits or more. However, if a motherboard is known not to perform bit Swizzling, the generator vector hardware may only need to be as wide as the host's scramble vector (e.g.—16 or 32 bits). In the Intel case above, that is sixteen bits, reflecting a savings of almost 5× in memory cost.

As the address input signals shown in FIG. 10 are DIMM relative, the address input signal starts at address bit position "3." Depending on whether the address input signals used are DIMM relative or host relative, the address input signal to the circuitry may start at other address bit positions.

Address Learning/Mapping

A host generally maps the monotonically increasing address in a nom-linear and/or non-orthogonal manner. An orthogonal mapping generally refers a mapping wherein a single bit change in the host address causes a single bit change in the physical DIMM address. A linear mapping generally refers to a mapping wherein the physical DIMM address increases monotonically within any of the address fields (e.g.—BA, RAS, CAS) as the host address increases monotonically. A perfectly linear mapping generally refers to a mapping wherein the physical DIMM address increases through an entire field (e.g.—BA, RAS, CAS) before switching to another field.

For instance, it has been found through testing that microprocessors produced by AMD generally employ a non-orthogonal (although some documentations show that an inverse mapping back to an orthogonal mapping may be possible) but linear address mapping. Microprocessors produced by Intel, on the other hand, generally employ an orthogonal but non-linear mapping. In either case, these address mappings are generally not optimized for use with a TeraDIMM.

Obtaining a proper mapping allows the TeraDIMM driver to address the set of buffers that are implemented in the Rush. Optimizing the mapping provides for efficient operations. A mapping is considered to be optimized if the data buffers are mapped as contiguous 4 KB chunks and if certain buffers appear in the address map multiple times. Particularly, it is preferable to place each Rush buffer in its own unique 16 KB page in the host memory map. An individual buffer may start at offset 0 of the page and may be 64 B, 5128 or 4 KB in size. The remainder of the page may be read back as zero buffers and ignored when written to by the host. Or, consistent with one embodiment, the remainder of the page may be aliased back to the buffer, allowing the data to be read multiple times within the 16 KB page.

The following Table 2 illustrates an example of how the host addresses of an Intel microprocessor-based system can be mapped into the Rush physical address. As the addressing below shows, the bottom six bits of the host address are not significant, assuming the bottom three bits are used to indicate the byte offset within a 64-bit word and the next three bits are used to indicate the starting offset for a 64 B (8 beat) burst.

TABLE 2

| Host Address Offset | Rush Internal Address Map | DIMM Physical Address | Comment |
|---|---|---|---|
| 0x0 | | | |
| 0x40 | COL[0] | CAS[3] | |
| 0x80 | COL[1] | CAS[4] | |
| 0x100 | COL[2] | CAS[5] | |
| 0x200 | COL[3] | CAS[6] | |
| 0x400 | COL[4] | CAS[7] | |
| 0x800 | COL[5] | CAS[8] | |
| 0x1000 | COL[6] | BA[0] | |
| 0x2000 | COL[7] | CAS[9] | |
| 0x4000 | ROW[0] | RAS[0] | |
| 0x8000 | ROW[1] | RAS[1] | |
| 0x10000 | ROW[2] | RAS[2] | |
| 0x20000 | ROW[3] | RAS[3] | |
| 0x40000 | ROW[4] | BA[1] | |
| 0x80000 | ROW[5] | BA[2] | |
| 0x100000 | ROW[6] | RAS[5] | |
| 0x200000 | ROW[7] | RAS[6] | |
| 0x400000 | ROW[8] | RAS[7] | |
| 0x800000 | ROW[9] | RAS[8] | |
| 0x1000000 | ROW[10] | RAS[9] | |
| 0x2000000 | ROW[11] | RAS[10] | |
| 0x4000000 | ROW[12] | RAS[11] | |
| 0x8000000 | ROW[13] | RAS[4] | |
| 0x10000000 | ROW[14] | RAS[12] | |
| 0x20000000 | ROW[15] | RAS[13] | |
| 0x40000000 | ROW[16] | RAS[14] | |
| 0x80000000 | ROW[17] | RAS[15] | |
| 0x100000000 | ROW[18] | CAS[11] | Ignored |

Figure 11:
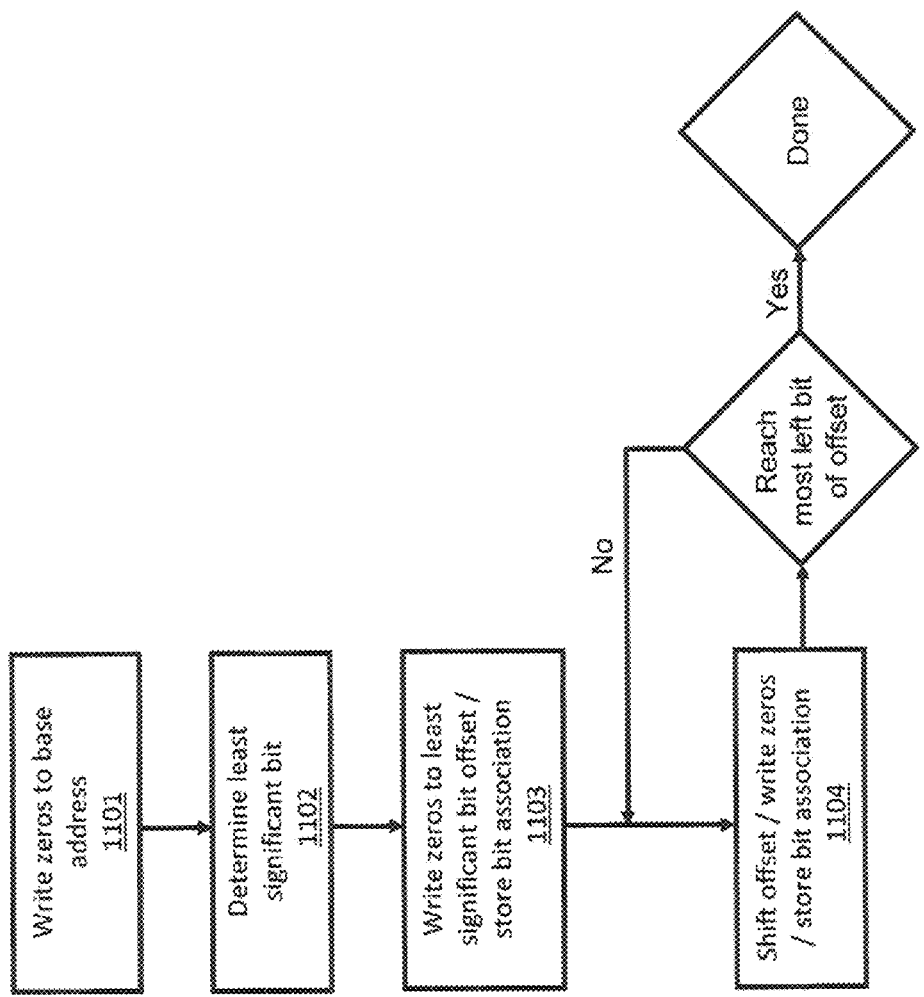
FIG. 11 illustrates an example flowchart of a method for generating an optimized address mapping, according to one embodiment.

An address mapping, such as the one shown in Table 2, may be created by having the host assert an address learning pattern that provides a series of addresses that are both monotonically increasing and orthogonal. Asserting such learning pattern allows the Rush ASIC to remap the externally visible address signals (e.g.—BA, RAS, CAS) from a non-linear and non-orthogonal address space into a linear and orthogonal address space. FIG. 11 illustrates an example flowchart of a method for generating an optimized address mapping, according to one embodiment. The host generates a series of writes to the TeraDIMM's host base address (e.g.—address offset=0) using the write instruction that bypasses the cache at step 1101. The data written is a pattern of all zeros. Next, the host determines the least significant bit of the host address based on a set of assumptions at step 1102. According to one embodiment illustrated in Table 2, the assumptions may include the following:

Given that DIMMs are 64-bits wide, each CAS address-corresponds to eight bytes. Thus, it is likely that the bottom three Host relative address bits are unused in the memory system.

As the DRAM supports bursts of 8 words, the next 3 address bits are relevant for determining the starting position of the burst and are the least significant 3 bits of the CAS address.

Next, the host sets the least significant bit of the host address to "1" and generates a series of writes to that host address (e.g.—TeraDIMM base address+0x40 offset address) at step 1103. During the series of writes, the Rush ASIC's address mapping hardware detects the physical DIMM address bit that is set to "1" and associates that DIMM address bit with a corresponding address bit internal to the Rush (e.g.—CAS[3] is associated with COL[0] in Table 2). An address association may be created through the use of one or more muxes and stored in a corresponding mux register, as illustrated later in FIG. 12.

Next, the host shifts the host address offset to the left by one bit position (e.g.—0x40 to 0x80) and generates a series of writes to that host address (e.g.—TeraDIMM base address+ 0x80 offset address) at step 1104. Again, the Rush's address mapping hardware detects the physical DIMM address bit that is set to "1" and associates that DIMM address bit with a corresponding address bit internal to the Rush (e.g.—CAS[4] is associated with COL[1] in Table 2). The association is stored in another corresponding mux register. Step 1104 is repeated until the entire host offset address space has been shifted through.

According to one embodiment, to ensure that some initial decoding can begin after the RAS cycle and not have to wait for the CAS cycle, the Rush associates all the ROW[ ] address bits during RAS cycles. For instance, once a ROW[ ] address signal has been associated, if for any subsequent host address location the corresponding physical DIMM address bit is a CAS' bit, that CAS bit is ignored and the Row[ ] address pointer does not advance (e.g.—the CAS bit is skipped and the remaining address bits are right shifted). As Table 2 illustrates, COLD address bits may be a mix of BA/RAS/CAS bits. This way, the CAS cycle bits are used to select part of a buffer, but the buffer was selected following the RAS cycle. According to one embodiment, CAS address bits may appear in the ROW space.

Figure 12A:
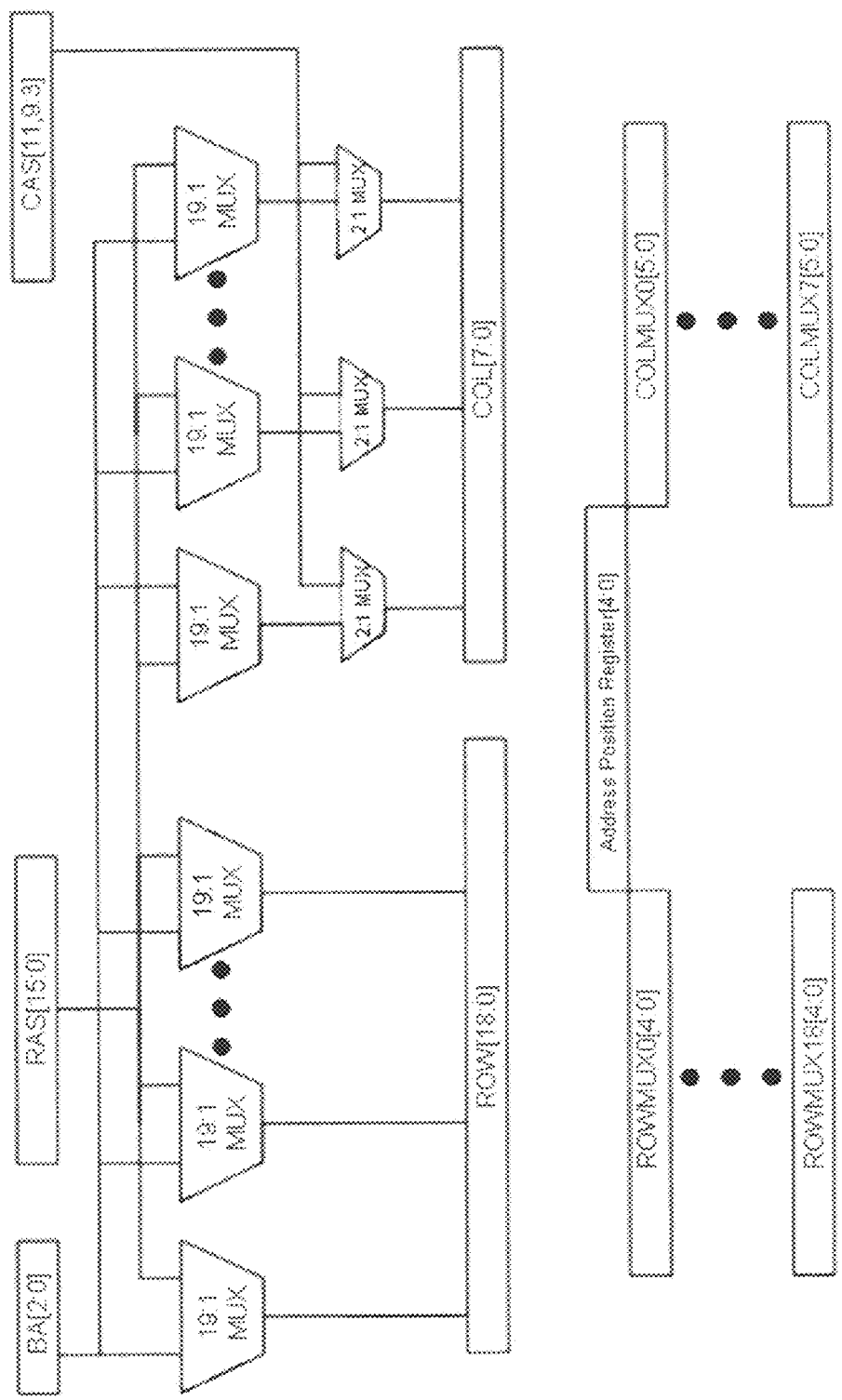
FIG. 12a illustrates a first logical implementation of circuitry for associating physical DIMM address bits with Rush internal address bits, according to one embodiment.
Figure 12B:
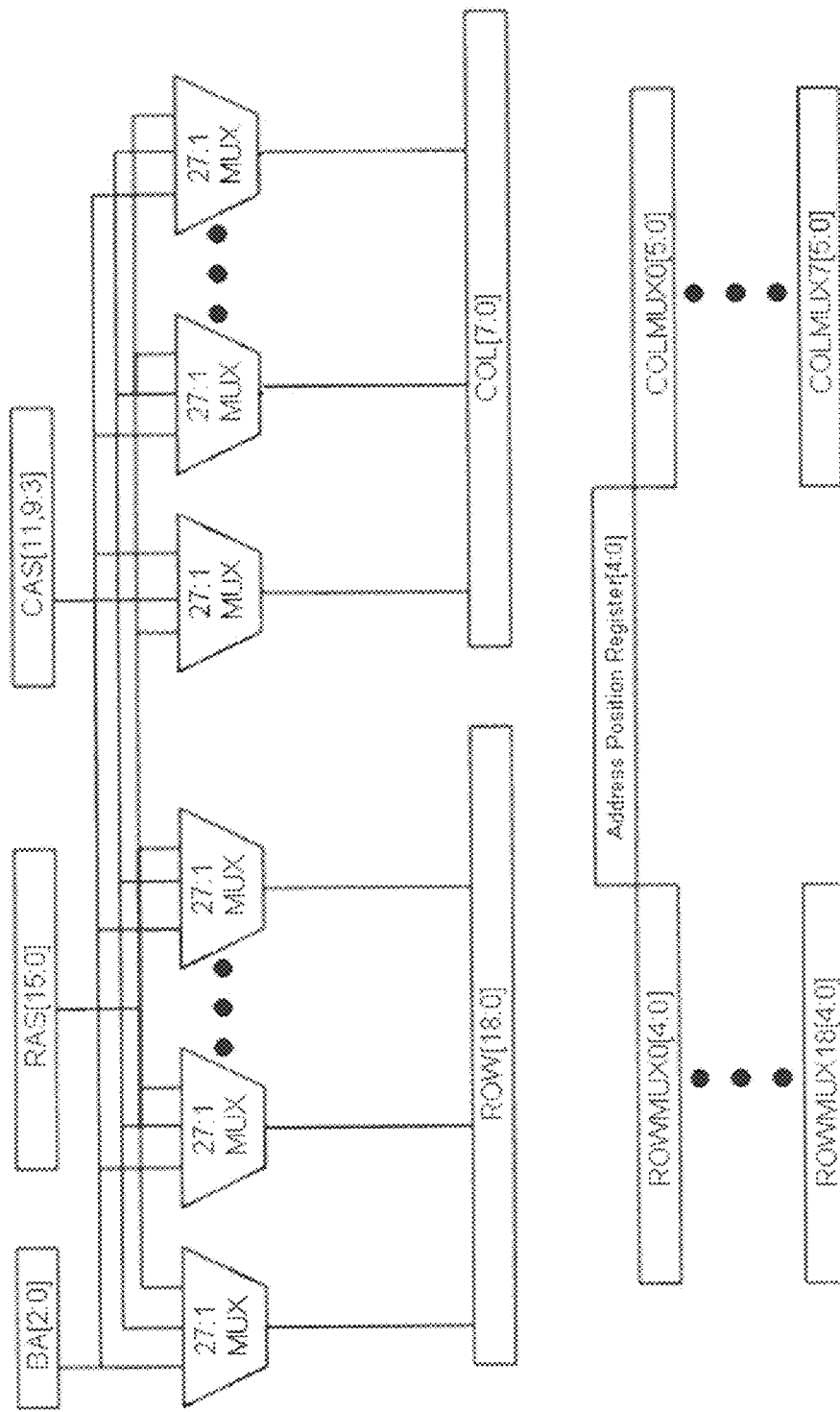
FIG. 12b illustrates a second logical implementation of circuitry for associating physical DIMM address bits with Rush internal address bits, according to one embodiment

FIG. 12a illustrates a logical implementation of circuitry for associating physical DIMM address bits with Rush internal address bits, according to one embodiment. The circuitry includes a plurality of muxes for associating BA/RA/CAS address bits with Rush's internal ROW[ ]/COL[ ] address bits. The circuitry also includes an address position register that is reset to "0" at the beginning of address learning. The exemplary operations of the illustrated circuitry are described as follows in accordance with the associations shown in Table 2. As the address position register increments through values 0 to 7, the mux registers COLMUX0 to COLMUX7 are initialized to select a corresponding BA, RAS, or CAS bit. As the address position register increments through values 8 to 26, the mux registers ROWMUX0 to ROWMUX8 are initialized to select a corresponding BA or RAS. At this point, if a host address corresponds to a physical CAS bit, the address position register is not incremented and the CAS bit is skipped. Having swept through the host address offset and the corresponding associations stored, the host can then read these registers to determine the final address mapping. FIG. 12b illustrates another embodiment of logical circuitry for associating; physical DIMM address bits with Rush internal address bits. The logical circuitry of FIG. 12b allows any BNRAS/CAS DIMM address bit to be mapped to any Rush internal address bit.

The goal of the Rush address map and the address mapping hardware, such as those shown in FIGS. 12a and 12b, is to provide buffers that always begin at offset 0 of a 16 KB page (e.g.—COL==0). Table 3 illustrates exemplary address decodings for accessing the different types of Rush buffers, according to one embodiment. The selection of page size (e.g.—16 KB) could change in different CPIO applications and is based on the size of data transfer that is optimal for the device.

TABLE 3

| HA[N:17] ROW[J + 3:3] Significant Bits | HA[16:14] ROW[2:0] Encoding | HA[13:0] COL[7:0] Significant Bits | Rush Address Space |
|---|---|---|---|
| J = 4, 32 Buffers | 000 | COL[5:0] | Read Data Buffers, 4096 B each |

TABLE 3-continued

| HA[N:17] ROW[J + 3:3] Significant Bits | HA[16:14] ROW[2:0] Encoding | HA[13:0] COL[7:0] Significant Bits | Rush Address Space |
|---|---|---|---|
| J = 2, 8 Buffers | 001 | COL[5:0] | Write Data Buffers Entry Point, |4096 B each |
| J = 4, 32 Buffers | 010 | COL[0] | Read Meta-Data Buffers, 128 B each |
| J = 2, 8 Buffers | 011 | COL[0] | Write Meta-Data Buffers Entry Point, 128 B each |
| J = 0, 1 Buffer | 100 | COL[2:0] | Status Return Buffer, 512 B each |
| J = 8, 512 Buffers | 101 | COL[0] | Command Buffers, 64 B each |
| J = 0, 1 Buffer | 110 | COL[5:0] | Extended Status Buffer, 4096 B each |
|  | 111 |  | Unused |

Regarding Table 3:
ROW[2:0] (nominally HA[16:14]) are used to define the type of buffer being accessed.
ROW[J+3:3] (nominally, HA[J+17:17]) are used to index the particular buffer. The value of J is dependent on the type of buffer being accessed.
ROW[18:J+4] (nominally HA[N:J+18]) will alias back to the particular buffer.
HA[N:0] represents the internal physical address space (as computed by the driver), where N is a function of the place in the memory map where the TeraDIMM memory space ends, which may be a larger address (e.g.—more bits) than just the length of the TeraDIMM. HA[N:M] defines the base address of the Rush rank and HA[M−1:0] defines an offset into the Rush Memory Map.

An advantage of this scheme is that it allows the declared size of the DIMM/Rush address space to be changed without any additional hardware in the device. Given the potentially bizarre mapping of the HA bits to BA/RAS/CAS bits, this provides the TeraDIMM driver with a straightforward method of computing the base address for any given buffer.

ECC and Data Interleave/Swizzle Learning

As mentioned earlier, ECC and data interleave/swizzle learning may be necessary because a TeraDIMM receives from the host semantic information, such as commands, that is expected in particular byte/bit fields. De-interleaving/de-swizzling brings the data into the Rush in CPU canonical ordering so that commands and data may be interpreted correctly. According to one embodiment, the ECC and de-interleave/de-swizzle circuitry may be built around a 256-bit core that operates twice on each 8-beat burst (512 bits). The core may also provide correct operation for 128:16 and 64:8 bit codes. According to one embodiment, the de-interleave/de-swizzle circuitry may include 256 256-bit muxes that can move data around arbitrarily within any bit position in a 4-beat burst. The ECC generation circuitry may include 32 256-bit wide AND/XOR gates (recall, generally, any ECC check bit is an XOR function of a subset of the data bits in a word). The same algorithm may be extended to ECC codes of larger size, with the selection of 256 being based on currently available CPUs.

Figure 13:
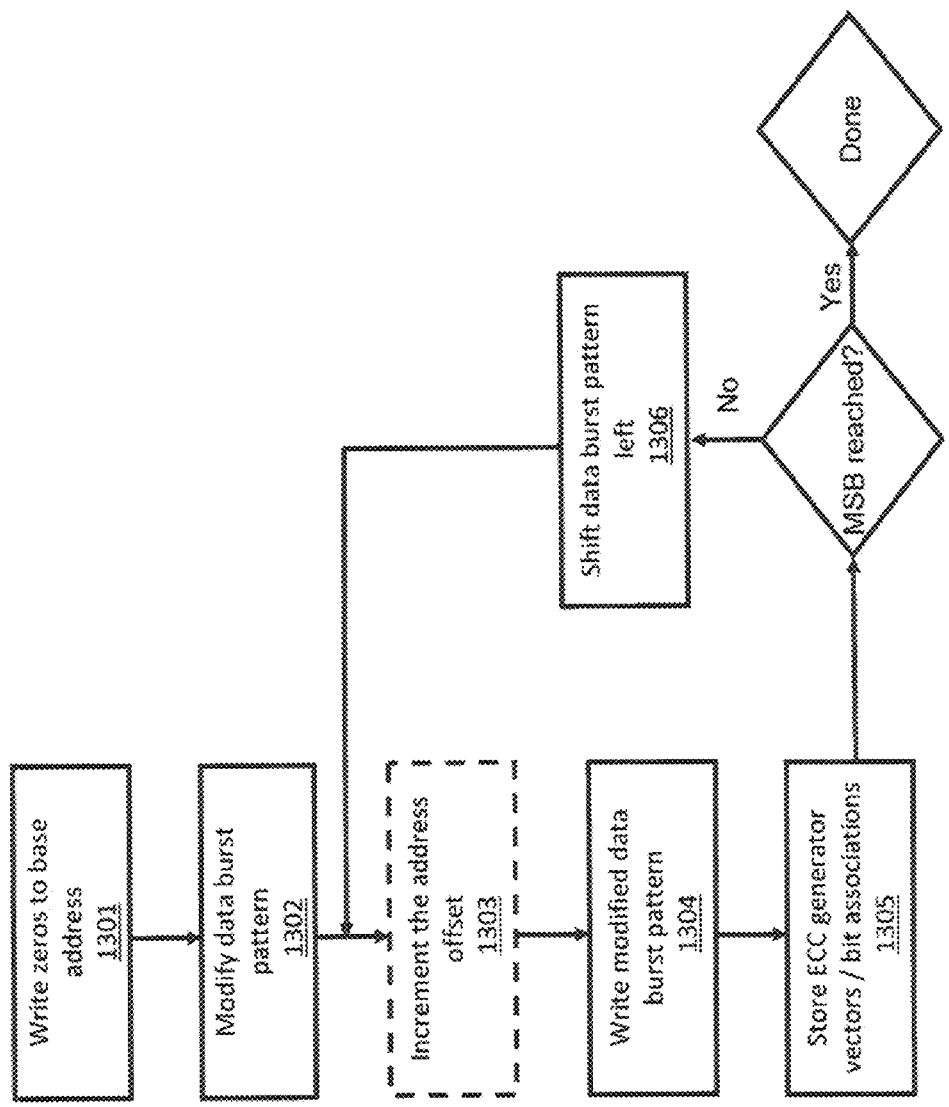
FIG. 13 illustrates an example flowchart of the steps for ECC and interleave/swizzle learning, according to one embodiment.

Both the ECC circuitry and the de-interleave/de-swizzle circuitry may be initialized using the same learning pattern. ECC and data interleave/swizzle learning involves running a data pattern that "walks" a "1" through the data field. FIG. 13 illustrates an example flowchart of the steps for ECC and interleave/swizzle learning, according to one embodiment. At step 1301, the host writes an all zeros data burst pattern to the TeraDIMM's base address with 0x0 address offset. This allows the Rush to determine if there is ECC inversion. Next, the host modifies the data burst pattern by setting the LSB (least significant bit) of the least significant 64-bit-word to value "1" at step 1302. The host optionally increments the address offset by 0x40 at step 1303. A 0x40 offset corresponds to a 64 B boundary. Although incrementing the offset is not necessary, incrementing the offset may be done to provide additional information for debugging. If incrementing the address offset is not desired, the host may skip to step 1304. At step 1304, the host writes the modified burst pattern to the base-address plus the incremented offset (if 1303 is not skipped). When the Rush sees data burst pattern and the ECC that is being written, the Rush stores the ECC data as a ECC generator vector that corresponds to the set (e.g.—"1") data bit at step 1305. The ECC generator is stored in a 32-bit register of the ECC circuitry. Also, the Rush associates the expected data bit position (e.g.—position seen by host) to the actually bit position seen by the Rush, for instance, using a 256-bit mux. The bit position association may stored in a corresponding mux control register. Next, the host determines whether the set bit is the MSB (most significant bit) of the most significant 64-bit word. If the set bit is not the MSB of the most significant 64-bit word, the host modifies the data burst pattern by shifting the pattern left by one bit (e.g.—001*b* to 010*b*) at step 1306. Steps 1303 to 1306 are repeated until the data burst pattern has shifted to its MSB of the most significant 64-bit word, at which point the ECC and interleave/swizzle learning is completed. It should be appreciated that although FIG. 13 illustrates the steps in a particular order, variations in the ordering of the steps are contemplated and within the scope of this disclosure. Additionally, it should be appreciated that for a given processor/motherboard the ECC generation, data interleaving and bit swizzling information may be known, and therefore, such information may be programmed into the Rush ASIC after system reset. For instance, such information may be read from a non-volatile storage unit (e.g.—on-DIMM serial ROM) or loaded into programmable registers by the BIOS, DBL, or device driver via side-band communications methods (e.g.—host to DIMM SMBus). In such cases, ECC and data interleave/swizzle learning may not need to be performed.

Figure 14:
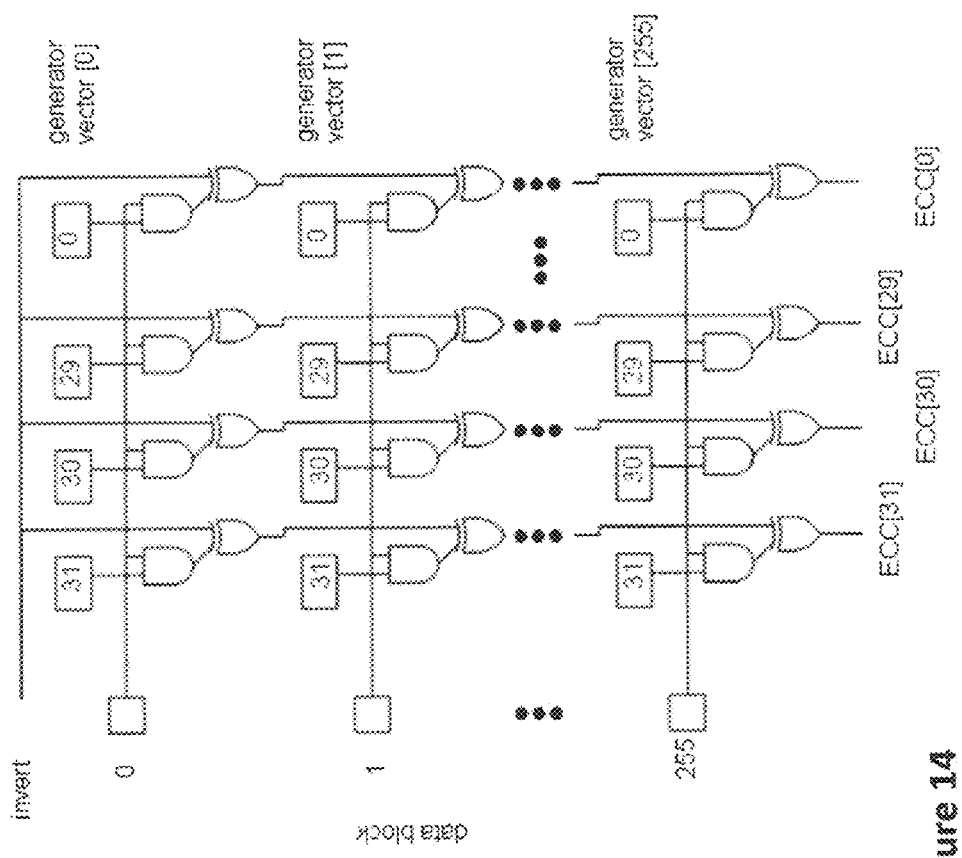
FIG. 14 illustrates a logical implementation of ECC circuitry for computing ECC bits, according to one embodiment.

FIG. 14 illustrates a logical implementation of ECC Circuitry for computing ECC bits, according to one embodiment. The illustrated circuitry is designed for a 256-bit data block with 32-bits of ECC. The computed ECC is the linear superposition (e.g.—XOR) of all generator vectors that correspond to data bits that are set to "1." As long as the layout of the data and ECC is the same, the ECC circuitry calculates the ECC regardless of the interleaving.

Rush Buffers

Host Read Buffers

It is recognized that there may be a challenge in meeting the required latency for DDR-3 memory systems. To support the highest speed possible, the Rush provides a set of read buffers that are located "close" to the DDR-3 physical layer, according to one embodiment. The buffers may include 32 4 KB and 32 128 B buffers that provide the host with a fast read path. The extra 128 B allows the host to read the meta-data stored with the flash page for SSDs that support the host meta-data function. One way to keep the internal addressing of the Rush buffers straightforward is to store the meta-data in separate memory instances from the main data. Once the host has read a given buffer, the TeraDIMM driver releases the buffer. This signals to the Rush that the buffer is available for use with new data. The Rush then transfers data from a general read/write buffer to a host read buffer. The Rush allocates the host read buffers and informs the driver of the final location in the status byte for each command. Host read buffers are located in fixed positions in the DIMM memory map. The number of general read/write buffers is generally on the order of the number of outstanding commands.

Write Buffer Entry Points

Write buffer entry points provide the host with a writeable/readable buffer that allows support of both scrubber and read/modify/write behaviour of the host memory controller. Scrubber operations are discussed later. According to one embodiment, there are eight entry points of 4 KB and eight entry points of 128 B. The host writes to these buffers. Once the data and command related to the buffer have been written, the buffer is transferred to a general read/write buffer.

The TeraDIMM driver generally interleaves data buffer writes with command buffer writes. Furthermore, the command buffer format includes fields that specify which buffer entry point a command is associated with as well as a checksum field associated with the data in a buffer. These two fields enable the hardware to determine which buffer entry point is associated with the command and the checksum allows the Rush to determine whether the entire buffer has been written. In addition to the 4 KB of data, each buffer has associated with it a 64-bit vector indicating that each cache line has been written at least once. This vector is maintained via hardware within the Rush. This allows the hardware to determine a reasonable starting point to predict whether the buffer is complete. Because read modify write behaviour on the part of the memory controller allows for an unknown sized portion of a given cache, line to be written, the prediction may not be accurate under in certain circumstances. Therefore, it may be necessary (but not sufficient) for all cache lines to have been written once. If the command processor verification of the checksum does not pass, then it is likely a portion of the buffer will be read and modified shortly. Therefore, the command processor can attempt to re-verify the checksum after a short wait.

General Write Buffers

The allocation of general buffers is handled by the TeraDIMM driver. This allows the host to dynamically adjust to the ratio of read/write commands. Depending on the capabilities of the SSD, it may not be possible to release a write buffer until the command is complete. However, to support increased performance for SSDs that are able to signal when a buffer can be released, the Rush can inform the driver if a write buffer has been transferred to the SSD.

Again, one way to keep the internal addressing of the Rush buffers straighfforward is to store the meta-data in-separate memory instances from the main data. From the host's perspective, the meta-data buffer space is separate from the data buffer. Within the internal space the buffers appear contiguous, but the internal logic will generate a correct address because writing to the memory buffers does not have the same critical path. According to one embodiment, there are a total of 256 general read/write buffers of 4 KB and another 256 128 B, buffers for meta-data.

Command Buffers

Generally, there are multiple entry points for command buffers in the Rush, one for each actual command buffer in the design. The host command buffers are placed in fixed locations in the memory map. According to one embodiment, there are 512 64 B control buffers for the host. The $1^{st}$ (or last) command buffer may be used for debugging and may not have an associated return status in the status buffers. Writing a command buffer causes it to be executed when the command status is complete. The host generally does not re-use a command buffer until it has been completed. The host allocates command buffers from within the pool. The host generally cannot read back command buffers. If read back, an all zeros buffer may be returned. This ensures that any interactions with the memory do not cause false commands to, be received.

Rush Scrubber Block

Traditionally, many microprocessors implement a low-level memory scrubbing module that ensures that all bytes in memory are read periodically. This allows single bit upsets to be detected and corrected before they become uncorrectable errors. A scrubbing module generally walks through the memory in a linear fashion (up or down) and reads each line. The module takes an exception and re-writes the data if there is a bit error. Some scrubbers may do two reads to ensure that the bit error was not due to bus noise.

Because the scrubber cannot be programmed to avoid particular portions of memory, the Rush includes a scrubber block that is responsible for responding to all addresses that are not readable. The operation of the scrubber block may utilize information regarding the mapping order and the sizes of the various fields. The data pattern sent back by the scrubber block is all zeros and corresponds to a NULL command.

According to one embodiment, the scrubber reading, locations within the DIMM memory map that do not map to readable locations in the Rush memory map may return the contents of a special buffer (e.g.—zero buffer) that is initialized to all 0s with correct ECC. The scrubber block may pre-calculate and store the ECC for a small range of addresses in host linear order. This does not necessarily mean that the TeraDIMM addresses (e.g.—RAS,CAS, BA) are in order because of the flexibility in mapping host addresses within a particular rank. The scrubber reading locations within the Rush memory map that correspond to writeable command buffers may also return the content of the zero buffer. The scrubber reading locations within the Rush memory map that correspond to writeable data buffers may return the updated content of the data buffer. The scrubber reading locations within the Rush memory map that correspond to readable data buffers return the contents of the data buffer. If the scrubber has detected an ECC error and has written a "correction" back to the location, the scrubber reading the location again may return the "corrected" data.

For read operations, the scrubber buffer (zero-buffer) is used for any address that doesn't map to an actual memory location and for any reference to a command buffer. By returning a null command as a data pattern, any DDR-3 bus noise that errors a command results in a NULL command being written to a command register, which will be ignored. There are two other special buffer types with regard to the scrubber: write data buffers and write meta-data buffers. These buffers should be both readable and writable in order to ensure that real data is not overwritten by the scrubber.

Ideally, the scrubber will never detect an ECC error. However, there are two possible causes for ECC errors: actual bit errors in the internal SRAM of the Rush and noise on the DDR-3 bus. For write buffer entry points, there is generally no issue with the scrubber writing back corrected data to the buffer. For host read buffers, on the other hand, it may not be known how quickly the scrubber re-reads the data after it writes back the corrected value. Thus, it may not be clear whether the Rush would in fact update the real memory with the corrected value. One way to ensure that the correct value is written, the Rush may implement a-small cache (e.g.—4 entry) that holds writes to non-writable memory locations. When such a write occurs, the command processor may receive an interrupt that includes the address of the correction so that it can scrub that location. When the buffer in question is deallocated, the firmware may determine, whether it needs to "manually" scrub the buffer or do nothing as the data for a read command is about to be transferred into the buffer anyway.

Read/Write Data Flow

Read Data Flow

Figure 15:
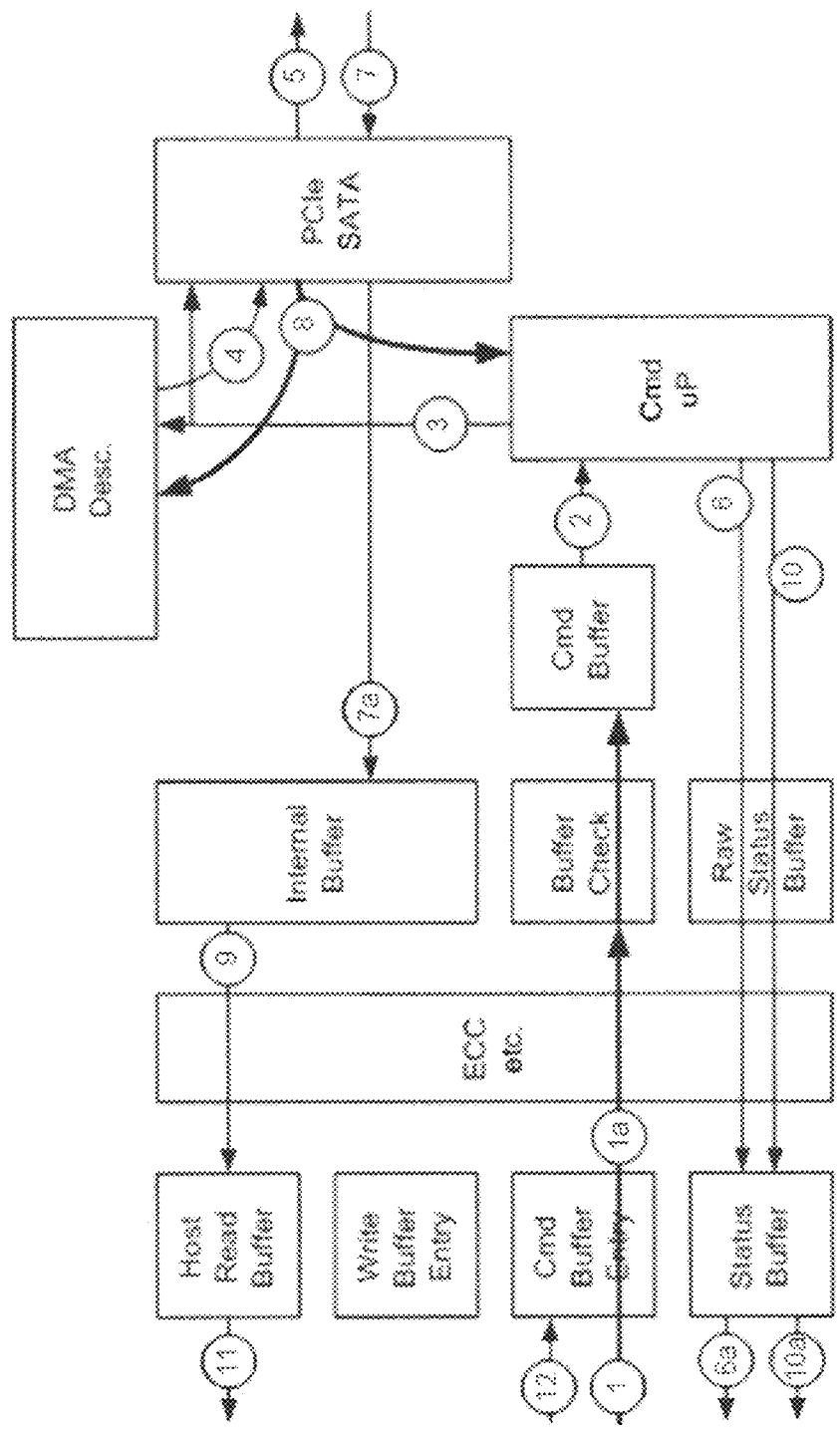
FIG. 15 illustrates a logical block diagram that shows the flow of commands and data for a read command, according to one embodiment.

FIG. 15 illustrates a logical block diagram that shows the flow of commands and data for a read command, according to one embodiment. The read process begins when the TeraDIMM driver at the host writes a "read" command to a particular command buffer entry, point at flow 1. The command then flows through the ECC/de-interleave/de-swizzle circuitry at flow 1a. Buffer check logic determines if and when the command is complete. If the command is complete, the command is transmitted to the command processor at flow 2.

Upon receiving the command, the command processor generates DMA descriptors and communicates the descriptors to the PCI-E/SATA block at flow 3. The PCI-E/SATA block reads the DMA descriptor at flow 4. The PCI-E/SATA block then sends a read request to the SSD at flow 5. During this time, the command processor updates the status buffer to indicate to the TeraDIMM driver that the command in progress at flow 6. The driver may or may not read the status at flow 6a.

At flow 7, the PCI-E/SATA block receives the requested read data from the SSD. The read data is written to the internal buffer at flow 7a. Status returned from the SSD is stored in the DMA descriptors at flow 8. Also, during this time, the command processor receives an interrupt from the PCI-E/SATA block. When a host read buffer becomes available, the read data in the internal buffer is copied to the host read buffer at flow 9. After the data has been copied, the command processor updates the status buffer with a final status at flow 10. This indicates to the driver that read data is ready to be read from the host read buffer. The TeraDIMM driver reads the status buffer and observes the final status at flow 10a. The TeraDIMM driver may read then read the requested read data from the host read buffer at flow 11. Once the TeraDIMM driver has finished reading the host read buffer, the TeraDIMM driver may de-allocate the host read buffer by writing a de-allocation command to the command buffer entry point at flow 12 and completes the data read sequence.

Write Data Flow

Figure 16:
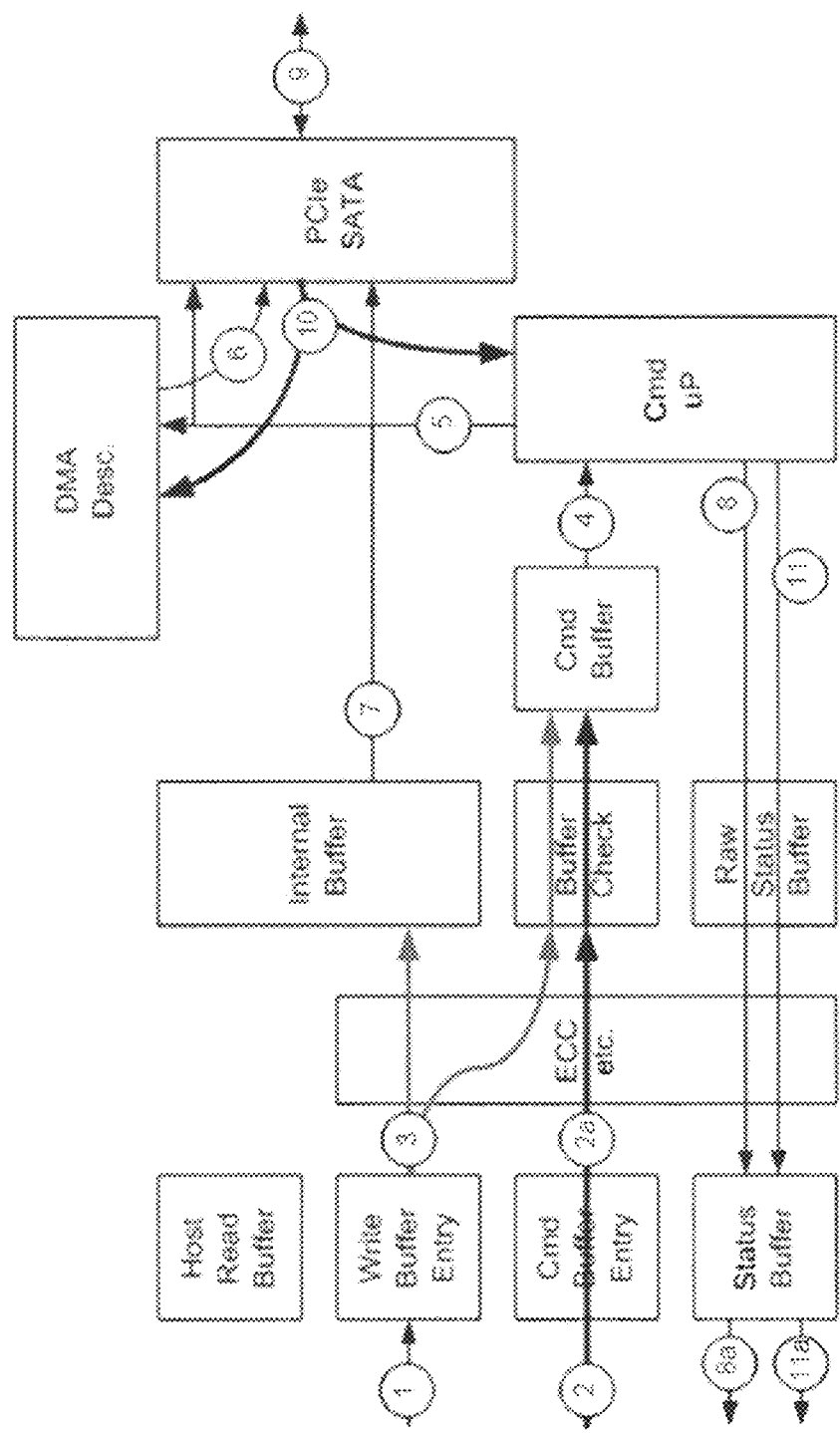
FIG. 16 illustrates a logical block diagram that shows the flow of commands and data for a write command, according to one embodiment.

FIG. 16 illustrates a logical block diagram that shows the flow of commands and data for a write command, according to one embodiment. The write process begins when the TeraDIMM driver at the host writes a data buffer into a particular write entry point at flow 1. The TeraDIMM driver then writes a "write" command to a particular command buffer entry point at flow 2. The command flows through the ECC/de-interleave/de-swizzle circuitry at flow 2a. Buffer check logic determines if and when the command is complete. If the command is complete, buffer check logic begins pulling write data from the write entry point to verify the checksum and to place the data into an internal buffer at flow 3. If the calculated checksum does not match the expected checksum, flow 3 may be restarted after a timeout period.

Once the data buffer and the command buffer are ready, the command processor is informed that there is new work at flow 4. The command processor generates DMA descriptors and communicates the descriptors to the PCI-E/SATA block at flow 5. The PCI-E/SATA block reads the DMA descriptor at flow 6. The PCI-E/SATA blockheads the data buffer at flow 7. During this time, the command processor updates the status buffer to indicate to the TeraDIMM driver that the command in progress at flow 8. The driver may or may not read the status at flow 8a.

At flow 9, the PCI-E/SATA block sends the data buffer to the SSD and SSD write operations occur. Status returned from the SSD is stored in the DMA descriptors at flow 10. Also, during this time, the command processor receives an interrupt from the PCI-E/SATA block. The command processor updates the status buffer with a final status at flow 11. This indicates to the driver that the data buffer has been written to the SSD. The TeraDIMM driver reads the status buffer and observes the final status at flow 11a and completes the transaction.

We claim:

1. A computer apparatus comprising:
   an interface configured to communicate with a host system via a memory controller on the host system to receive bit-interleaved data that is interleaved using an unknown interleave mapping;
   a data de-interleaver configured to:
     solve for the unknown interleave mapping associated with the bit-interleaved data to determine a mapping solution, and
     de-interleave the bit-interleaved data based on the mapping solution to generate de-interleaved data; and
   a processing unit configured to process the de-interleaved data.

2. The computer apparatus of claim 1 further comprising a data descrambler configured to descramble the bit-interleaved data by solving for an unknown scramble sequence, wherein the bit-interleaved data is scrambled based on an address associated with the bit-interleaved data and the unknown scramble sequence.

3. The computer apparatus of claim 2, wherein to descramble the bit-interleaved data includes:
   determining a scramble vector for each address bit of an n-bit address space associated with the computer apparatus, and
   applying one or more of the scramble vectors to descramble the bit-interleaved data based on an address associated with the bit-interleaved data.

4. The computer apparatus of claim 2, wherein solving for an unknown scramble sequence includes solving for a generator vector associated with each address bus signal.

5. The computer apparatus of claim 2, wherein to determine a scramble vector includes retrieving the scramble vector from at least one of a serial ROM and an SMBus.

6. The computer apparatus of claim 2 wherein the data descrambler is configured to descramble a data value received from the host system and scrambling a value for sending to the host system, the unscrambling and scrambling is performed based on associated address values.

7. The computer apparatus of claim 1 further comprising an address mapper configured to determine a linear address mapping and multiplex address signals from the host system's memory controller based on the linear address mapping.

8. The computer apparatus of claim 7, wherein to determine a linear address mapping includes retrieving the linear address mapping configuration from at least one of a serial ROM and an SMBus.

9. The computer apparatus of claim 1 wherein the processing unit is further configured to enter a learning mode in response to receiving multiple data patterns sequentially from the host system and matching a number of bit changes between each consecutive write with a mode unlock sequence.

10. The computer apparatus of claim 1 further comprising a scrubber block that is configured to return data and valid ECC values for the data when reading non-readable addresses.

11. The computer apparatus of claim 1, further comprising a non-volatile memory storage device.

12. The system of claim 11, further comprising a memory controller, wherein the memory controller detects the non-volatile memory storage device as one of a RDIMM, a UDIMM, and a LRDIMM.

13. A method for descrambling data received from a host system, comprising the steps of:
    solving for an unknown scramble sequence, based on which the data is scrambled by the host system, by:
        instructing the computer system to write a zero data pattern to address zero to generate a first scrambled data value;
        storing the first scrambled data value as one of the scramble generator vectors; and
    for each one signal in the set of address signals,
        setting only the one signal to "1" value while other signals in the set of address signals are set to "0" value,
        writing a zero data pattern to an address corresponding to the address signals to generate a second scrambled data value,
        performing a bitwise XOR operation of the first scrambled data value and the second scrambled data value to generate a scramble generator vector associated with the one of the address signals,
        storing the scramble generator vector associated with the one of the address signals; and
    performing a bitwise XOR operation of the scramble sequence and the data.

* * * * *

UNITED STATES PATENT AND TRADEMARK OFFICE
CERTIFICATE OF CORRECTION

PATENT NO. : 8,713,379 B2
APPLICATION NO. : 13/303048
DATED : April 29, 2014
INVENTOR(S) : Michael L. Takefman et al.

It is certified that error appears in the above-identified patent and that said Letters Patent is hereby corrected as shown below:

In the Specification

Column 2, In line 33, insert --;-- after "embodiment"

Column 6, In line 43, after "are" delete """

Column 11, In line 42, replace "8Q6" with --806--

Column 12, In line 1, after "should" delete "to"

Column 12, In line 33, replace "hot" with --not--

Column 13, In line 31, replace "D^" with --^D--

Column 13, In line 56, replace "0b^($0^v_l^0^...^v_c$" with --$v_c = v_l \, \hat{} \, v_c \, \hat{} \, v_c$--

Column 13, In line 58, replace "value^" with --value--

Column 14, In line 7, delete "s" from "buts"

Column 14, In line 9, delete "s" from "uses"

Column 14, In line 25, replace "nom" with --non--

Column 14, In line 26, insert --to-- after "refers"

Column 18, In line 18, after "may" insert --be--

Column 20, In line 4, after "to" delete ","

Signed and Sealed this
Thirtieth Day of September, 2014

Michelle K. Lee
*Deputy Director of the United States Patent and Trademark Office*